United States Patent [19]

Tsushima

[11] Patent Number: 4,658,305

[45] Date of Patent: Apr. 14, 1987

[54] VIDEO SIGNAL RECORDING AND REPRODUCING APPARATUS HAVING A PRE-EMPHASIS AND DE-EMPHASIS SYSTEM FOR NOISE REDUCTION

[75] Inventor: Takuya Tsushima, Ayase, Japan

[73] Assignee: Victor Company of Japan, Ltd., Yokohama, Japan

[21] Appl. No.: 634,810

[22] Filed: Jul. 26, 1984

[30] Foreign Application Priority Data

Jul. 29, 1983 [JP] Japan .................................. 58-138874

[51] Int. Cl.$^4$ ......................... H04N 9/80; G11B 20/24
[52] U.S. Cl. .................................... 358/327; 358/340; 358/167; 360/65
[58] Field of Search .................... 358/36, 37, 136, 166, 358/167, 315, 327, 328, 330, 336, 340; 360/29, 30, 33.1, 65, 67, 68

[56] References Cited

U.S. PATENT DOCUMENTS

| | | | |
|---|---|---|---|
| 3,920,889 | 11/1975 | Connor | 358/166 |
| 4,064,530 | 12/1977 | Kaiser et al. | 358/36 |
| 4,178,606 | 12/1979 | Hirota | 358/328 |
| 4,242,704 | 12/1980 | Ito et al. | 358/167 |
| 4,296,436 | 10/1981 | Achiha | 358/167 |
| 4,303,952 | 12/1981 | Yamamitsu et al. | 360/29 |
| 4,348,692 | 9/1982 | Ilmer | 360/65 |
| 4,355,333 | 10/1982 | Sato | 360/160 |
| 4,510,530 | 4/1985 | Miura | 358/314 |

FOREIGN PATENT DOCUMENTS 0081198 6/1983 European Pat. Off. .

Primary Examiner—Raymond F. Cardillo
Assistant Examiner—Robert A. Weinhardt
Attorney, Agent, or Firm—Ladas & Parry

[57] ABSTRACT

A video signal recording and reproducing apparatus comprises a circuit for separating a luminance and carrier chrominance signals from a color video signal and for recording on and reproducing from a recording medium a multiplexed signal in which a frequency modulated luminance signal and a frequency converted carrier chrominance signal which is frequency-converted into a low frequency band are multiplexed, a circuit for obtaining a reproduced luminance signal, a circuit for obtaining a reproduced carrier chrominance signal which is in an original frequency band and has an original phase by subjecting a reproduced frequency converted carrier chrominance signal to a signal processing, a de-emphasis circuit supplied with the reproduced luminance signal and/or an input signal or the reproduced carrier chrominance signal of the processing circuit, for relatively attenuating the level of a high-frequency component in a temporal frequency of the reproduced luminance signal and/or an input signal or the reproduced carrier chrominance signal of the processing circuit compared to a low-frequency component, and a mixer for mixing the reproduced luminance signal and the reproduced carrier chrominance signal so as to produce a reproduced color video signal.

7 Claims, 32 Drawing Figures

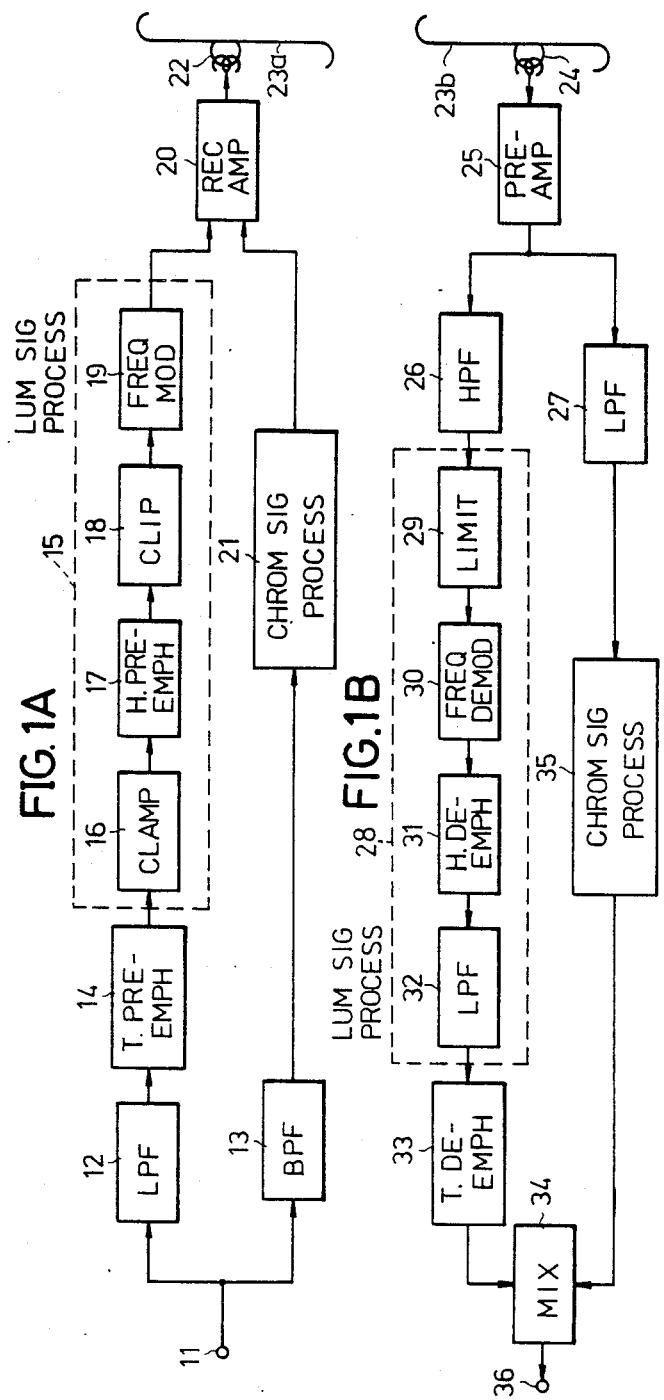

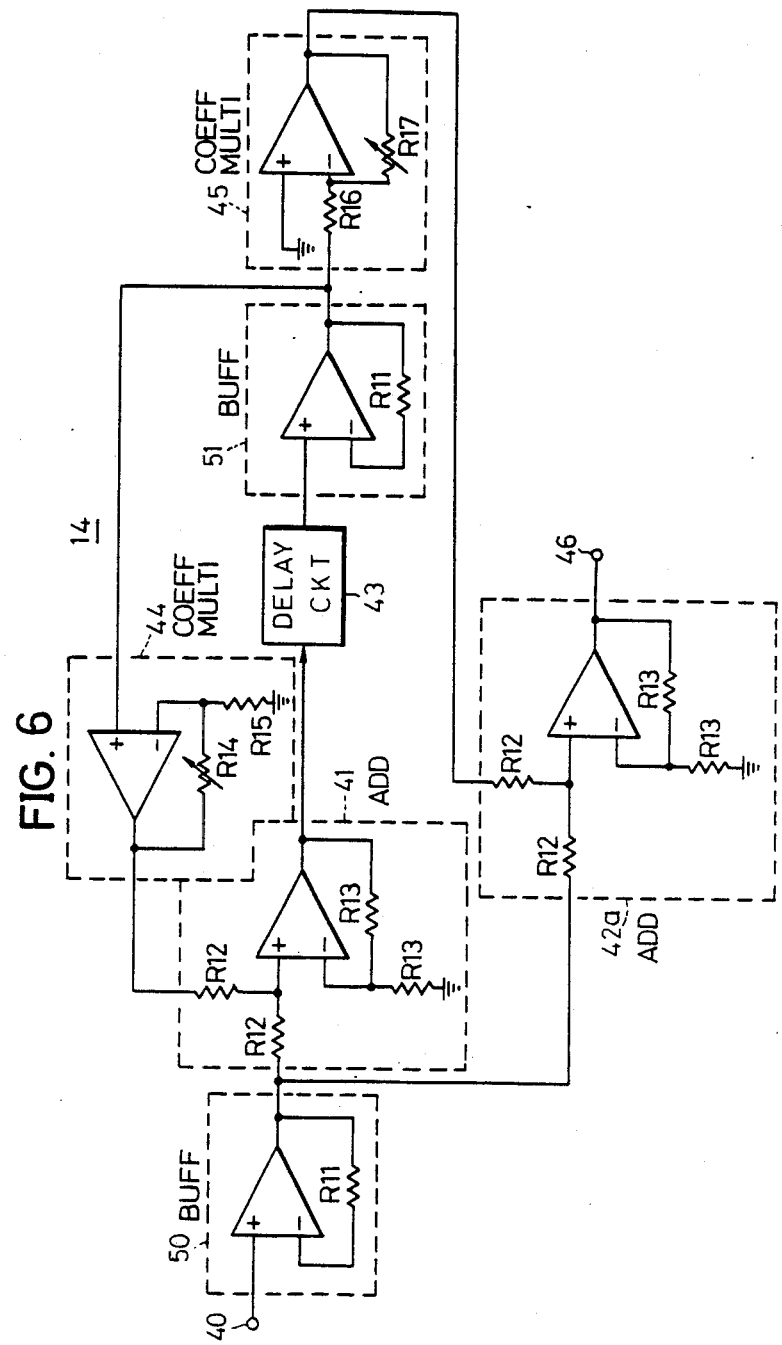

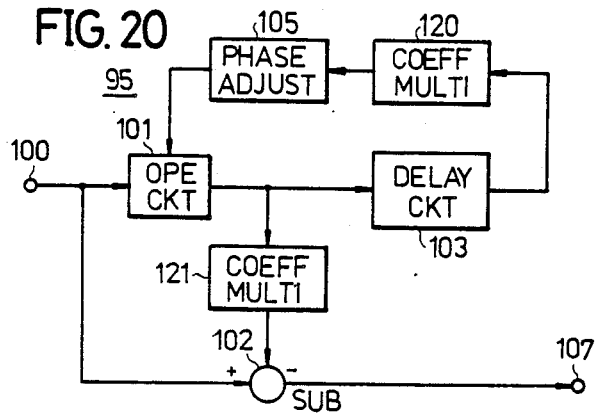
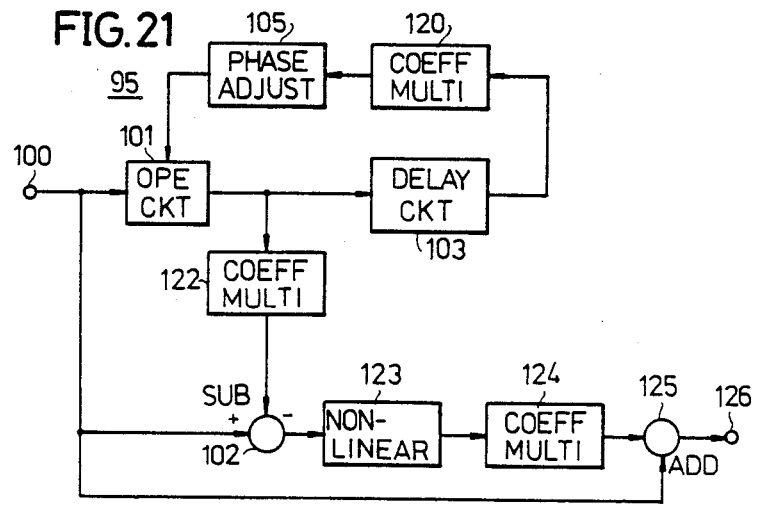
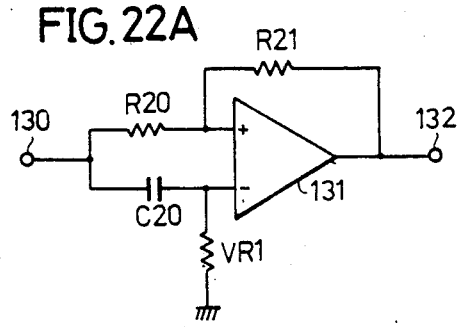
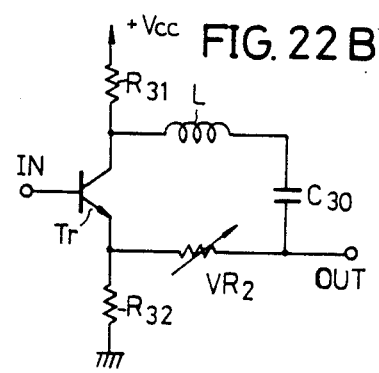

VIDEO SIGNAL RECORDING AND REPRODUCING APPARATUS HAVING A PRE-EMPHASIS AND DE-EMPHASIS SYSTEM FOR NOISE REDUCTION

BACKGROUND OF THE INVENTION

The present invention generally relates to video signal recording and reproducing apparatuses for recording and reproducing a video signal, and more particularly to a video signal recording and reproducing apparatus which performs a pre-emphasis at the time of a recording with respect to a frequency in a time base direction of at least one of a luminance signal and a carrier chrominance signal, and performs a de-emphasis at the time of a reproduction with respect to the frequency in the time base direction of the pre-emphasized luminance signal and/or the pre-emphasized carrier chrominance signal so as to obtain a reproduced luminance signal and/or a reproduced carrier chrominance signal having an original signal waveform and reduced noise. In the present specification, the frequency in the time base direction will be referred to as a temporal frequency. Further, an emphasis performed with respect to the temporal frequency, will be referred to as a temporal emphasis.

Conventionally, pre-emphasis and de-emphasis circuits are known for reducing noise in a video signal which is recorded and reproduced. In a recording system, the recording video signal is subjected to a pre-emphasis in the pre-emphasis circuit, and the reproduced video signal is subjected to a de-emphasis in the de-emphasis circuit within a reproducing system. In the case of a frequency modulated video signal, the signal-to-noise (S/N) ratio becomes poorer for high-frequency components of the frequency modulated video signal. However, the pre-emphasis circuit can emphasize the high-frequency components of the video signal before the recording. At the time of the reproduction, the high-frequency components of the reproduced video signal are de-emphasized back to their original levels. Therefore, it is possible to record and reproduce the high-frequency components of the video signal with a satisfactory S/N ratio by use of such pre-emphasis and de-emphasis circuits.

A conventional pre-emphasis circuit employed a highpass filter or a transversal filter comprising a capacitor (C) and a resistor (R). A conventional de-emphasis circuit employed a lowpass filter or a transversal filter comprising a capacitor (C) and a resistor (R). Both the pre-emphasis and de-emphasis circuits were designed to add, to an information which is related to a signal obtained at the present point in time, a weighed information which is related to a signal obtained at a past point in time which is extremely close to the present. This weighted information is obtained by subjecting the information which is related to the signal obtained at the past point in time which is extremely close to the present, to a predetermined weighting.

However, as will be described later on in the specification in conjunction with the drawings, the conventional emphasis circuits were designed to perform the pre-emphasis or the de-emphasis, by subtracting from or adding to an information related to a predetermined point in a reproduced picture, information related to a plurality of points which are positionally lagging (to the left of the predetermined point in the reproduced picture) or advanced (to the right of the predetermined point in the reproduced picture) with respect to the predetermined point on a horizontal scanning line which includes the predetermined point. According to such emphasis circuits, the high-frequency noise in the horizontal direction will be averaged, and the S/N ratio of the video signal will be improved. In the present specification, the emphasis performed in the conventional emphasis circuits, will be referred to as horizontal emphasis.

Because the conventional emphasis circuit only performs the horizontal emphasis described above, the noise can be reduced satisfactorily in a case where the noise is in the form of a vertical line which is long in the vertical direction of the picture and has a short width in the horizontal direction of the picture, for example. The noise can be reduced satisfactorily in this case, since the frequency of the noise in the horizontal direction is high. On the other hand, in a case where the noise is in the form of a horizontal line which has a short width in the vertical direction of the picture and is long in the horizontal direction of the picture, the frequency of the noise in the horizontal direction is low. For this reason, the noise reducing effect was very poor in this case, and the conventional emphasis circuit suffered a disadvantage in that such a noise in the form of a horizontal line could hardly be reduced. In the present specification, the above noise in the form of a horizontal line which has a low frequency in the horizontal direction of the picture and has a high frequency in the vertical direction of the picture, will be referred to as a horizontal line noise. In actual practice, the horizontal line noise, is easily generated in the reproduced picture. Hence, there was a demand for a system which could effectively reduce such a horizontal line noise.

In addition, since the pre-emphasis circuit has a frequency characteristic for emphasizing the level of the high-frequency component of the input signal, an overshoot and an undershoot occur at the rising and falling edges of the output pre-emphasized signal when the input signal is a video signal having sharp rises and sharp falls. When this pre-emphasized video signal is frequency-modulated in a frequency modulator, the instantaneous frequency of the frequency modulated video signal which is produced from the frequency modulator becomes extremely high at the leading edge of the pre-emphasized video signal, where the overshoot occurs and the level rises to white level from black level. Thus, when the above frequency modulated video signal is recorded onto and reproduced from a magnetic tape, the level of the frequency modulated video signal may exceed a slicing range of a limiter which is located in a stage prior to a frequency modulator, in a case where the overshoot exceeds a predetermined level. When the level of the frequency modulated video signal exceeds the slicing range of the limiter, a signal dropout will occur in the output of the limiter, and this signal dropout will be frequency-demodulated as a low-frequency signal in the frequency demodulator. As a result, the level of the frequency demodulated video signal will drop to the black level, and the so-called color inversion phenomenon is introduced.

Accordingly, a clipping circuit which clips the emphasized signal so that the level at the tip of the overshoot does not exceed a predetermined level, was generally provided in a stage prior to the frequency modulator. However, as the degree of emphasis is increased in order to obtain a larger emphasis effect, the overshoots and undershoots in the emphasized signal becomes greater. In this case, the degree of clipping becomes greater so as to properly clip the greater overshoots and undershoots, and as a result, the picture quality becomes poor at the leading and trailing edges of the emphasized signal. For this reason, it is undesirable to excessively increase the degree of emphasis for the purpose of reducing the horizontal line noise.

On the other hand, there is a conventional circuit for reducing the noise with respect to the reproduced carrier chrominance signal, by using the line correlation in the reproduced carrier chrominance signal. However, according to this conventional circuit, the signal component of the reproduced carrier chrominance signal having no line correlation, is also reduced together with the noise. As a result, there is a problem in that the vertical resolution becomes poor although the noise is reduced.

SUMMARY OF THE INVENTION

Accordingly, it is a general object of the present invention to provide a novel and useful video signal recording and reproducing apparatus, in which the above described problems have been eliminated.

Another and more specific object of the present invention is to provide a video signal recording and reproducing apparatus, which has a temporal pre-emphasis circuit for performing a pre-emphasis at the time of a recording with respect to a temporal frequency of a luminance signal and/or a carrier chrominance signal so as to relatively emphasize the level of a high-frequency component in the temporal frequency of the luminance signal and/or the carrier chrominance signal compared to a low-frequency component and to record the pre-emphasized signal on a recording medium, and has a temporal de-emphasis circuit for performing a de-emphasis at the time of a reproduction with respect to the temporal frequency of the pre-emphasized luminance signal and/or the pre-emphasized carrier chrominance signal reproduced from the recording medium so as to relatively attenuate the high-frequency component in the temporal frequency of the pre-emphasized luminance signal or the pre-emphasized carrier chrominance signal compared to the low-frequency component and to obtain a reproduced luminance signal and/or a reproduced carrier chrominance signal. According to the apparatus of the present invention, the temporal pre-emphasis and the temporal de-emphasis which are performed, are independent of the horizontal or vertical spatial frequency of the video signal (that is, the luminance signal and/or the carrier chrominance signal). For this reason, the apparatus according to the present invention has the effect of reducing those noise which cannot be reduced by the horizontal or vertical emphasis which are performed with respect to the horizontal or vertical direction of the picture. Moreover, it is possible to prevent the temporal frequency versus level characteristic from becoming deteriorated by the de-emphasis, since a pre-emphasis complementary to the de-emphasis is performed in the recording system beforehand so as to emphasize the temporal frequency versus level characteristic. Thus, it is possible to improve the S/N ratio of the reproduced luminance signal and/or the reproduced carrier chrominance signal without introducing a deterioration in the temporal frequency versus level characteristic, and the vertical resolution will not become poor.

Still another object of the present invention is to provide a recording and reproducing apparatus at least comprising in the reproducing system thereof, a temporal de-emphasis circuit having a non-linear de-emphasis characteristic for performing a de-emphasis with respect to a temporal frequency of a reproduced luminance signal and/or a reproduced carrier chrominance signal so as to relatively attenuate a high-frequency component in the temporal frequency of the reproduced luminance signal and/or the reproduced carrier chrominance signal compared to a low-frequency component, dependent on the level of an input signal. According to the apparatus of the present invention, the level of the luminance signal and/or the carrier chrominance signal reproduced through the temporal de-emphasis circuit, is not emphasized to a large extent as the level increases. Hence, it is possible to obtain a reproduced luminance signal and/or a reproduced carrier chrominance signal essentially having an original signal waveform, even when the luminance signal and/or the carrier chrominance signal are/is reproduced from a magnetic tape which is recorded by an existing video tape recorder (VTR).

A further object of the present invention is to provide a recording and reproducing apparatus comprising a temporal pre-emphasis circuit in the recording system thereof, where the temporal pre-emphasis circuit has a non-linear pre-emphasis characteristic complementary to the non-linear de-emphasis characteristic of the temporal de-emphasis circuit described above. According to the apparatus of the present invention, the non-linear pre-emphasis and the non-linear de-emphasis are performed dependent on the level of the input video signal, so that the temporal pre-emphasis and the temporal de-emphasis are not performed to a large extent as the level of the input video signal increases. Hence, it is possible to reduce overshoots and undershoots which occur due to the emphasis when a moving picture contains a high-speed movement or when the scene in the picture is changed. As a result, it is possible to reduce the information which is discarded by the white clipping and the dark clipping, and it is possible to reduce the deterioration in the picture quality after the edge (change of the scene in the picture, for example) of the video signal. Since the level of the luminance signal and/or the carrier chrominance signal is not emphasized to a large extent at the time of the recording, it is possible to obtain a reproduced luminance signal and/or a reproduced carrier chrominance signal essentially having an original signal waveform, even when the video signal is reproduced in the existing VTR from a magnetic tape which is recorded by the apparatus according to the present invention.

Other objects and further features of the present invention will be apparent from the following detailed description when read in conjunction with the accompanying drawings.

BRIEF DESCRIPTION OF THE DRAWINGS

FIGS. 1A and 1B are systematic block diagrams showing a first embodiment of a recording system and a reproducing system in a recording and reproducing apparatus according to the present invention;

FIG. 6 is a circuit diagram showing an embodiment of a concrete circuit of the temporal pre-emphasis circuit shown in FIG. 5;

FIG. 20 is a systematic block diagram showing a second embodiment of the temporal pre-emphasis circuit in the block system shown in FIG. 17A;

FIG. 21 is a systematic block diagram showing a third embodiment of the temporal pre-emphasis circuit in the block system shown in FIG. 17A;

FIGS. 22A and 22B show examples of a concrete circuit construction of a phase adjuster.

DETAILED DESCRIPTION

Figure 2A:
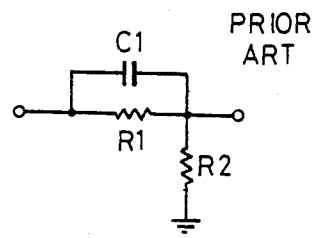
FIGS. 2A and 2B are circuit diagrams respectively showing an example of a conventional pre-emphasis circuit and an example of a conventional de-emphasis circuit.

First, description will be given with respect to a first embodiment of the recording and reproducing apparatus according to the present invention, by referring to FIGS. 1A and 1B. In this first embodiment of the invention, a luminance signal is pre-emphasized at the time of the recording with respect to a temporal frequency of the luminance signal, and a reproduced luminance signal is de-emphasized at the time of the reproduction with respect to the temporal frequency of the reproduced luminance signal. In FIG. 1A, a standard television system color video signal is applied to an input terminal 11. The color video signal is supplied to a lowpass filter 12 wherein a luminance signal is separated, and to a bandpass filter 13 wherein a carrier chrominance signal is separated. The separated luminance signal is supplied to a temporal pre-emphasis circuit 14 and is subjected to a temporal pre-emphasis. The temporal pre-emphasis circuit 14 relatively emphasizes a high-frequency component in a temporal frequency of the separated luminance signal compared to a low-frequency component, independently of the level of the separated luminance signal or dependent on the level of the separated luminance signal. The pre-emphasized luminance signal is supplied to a luminance signal processing circuit 15. The construction of the luminance signal processing circuit itself is known in the VTR.

The luminance signal processing circuit 15 comprises a clamping circuit 16, a horizontal pre-emphasis circuit 17, a clipping circuit 18, and a frequency modulator 19. The luminance signal from the temporal pre-emphasis circuit 14 is clamped in the clamping circuit 16 so that the synchronizing tip is clamped to a predetermined voltage. An output signal of the clamping circuit 16 is supplied to the horizontal pre-emphasis circuit 17 wherein the conventional horizontal pre-emphasis is performed. An output signal of the horizontal pre-emphasis circuit 17 is supplied to the clipping circuit 18 wherein a large level component larger than a predetermined level and a small level component smaller than a predetermined level are respectively clipped. An output signal of the clipping circuit 18 is frequency-modulated in the frequency modulator 19, and is then supplied to a recording amplifier 20.

For example, a known pre-emphasis circuit comprising a capacitor $C_1$ and resistors $R_1$ and $R_2$ as shown in FIG. 2A, may be used for the horizontal pre-emphasis circuit 17. The circuit shown in FIG. 2A has a frequency response characteristic shown in FIG. 3A, and performs a pre-emphasis so as to relatively emphasize a high-frequency component of the input signal thereof compared to a low-frequency component.

On the other hand, the separated carrier chrominance signal is supplied to a carrier chrominance signal processing circuit 21. The construction of the carrier chrominance signal processing circuit 21 itself is known in the VTR. In the carrier chrominance signal processing circuit 21, the separated carrier chrominance signal is frequency-converted into an unoccupied frequency band which is lower than the frequency band of the frequency modulated luminance signal, and is converted into a predetermined signal format by being subjected to a known phase shift process disclosed in the U.S. Pat. No. 4,178,606 in which the assignee is the same as the assignee of the present application or in the British Patent No. 2,040,135 in which the applicant is the same as the assignee of the present application. The phase shift process is performed in order to eliminate the undesirable crosstalk from a track which is adjacent to the track which is actually being scanned. The frequency modulated luminance signal from the luminance signal processing circuit 15 and the frequency converted carrier chrominance signal from the carrier chrominance signal processing circuit 21, are respectively supplied to the recording amplifier 20 wherein the signals are mixed and amplified. The mixed signal from the recording amplifier 20 is recorded on a magnetic tape 23a by a recording rotary head 22.

On the other hand, at the time of the reproduction, the recorded signal on a magnetic tape 23b, which is the same as the signal recorded on the magnetic tape 23a, is reproduced by a reproducing rotary head 24. The reproduced signal from the reproducing rotary head 24 is passed through a pre-amplifier 25, and is supplied to a highpass filter 26 and to a lowpass filter 27. The frequency modulated luminance signal within the reproduced signal is separated in the highpass filter 26, and the separated frequency modulated signal is supplied to a luminance signal processing circuit 28 wherein the frequency modulated luminance signal is demodulated into a reproduced luminance signal in the original frequency band. The construction of the luminance signal processing circuit 28 itself is known in the VTR.

The luminance signal processing circuit 28 comprises a limiter 29, a frequency demodulator 30, a horizontal de-emphasis circuit 31, and a lowpass filter 32. The reproduced frequency modulated luminance signal from the highpass filter 26 is subjected to an amplitude limitation in the limiter 29, and an output signal of the limiter 29 is demodulated in the frequency demodulator 30 into a reproduced luminance signal. The output reproduced luminance signal of the frequency demodulator 30 is subjected to a horizontal de-emphasis in the horizontal de-emphasis circuit 31 which has a de-emphasis characteristic complementary to the pre-emphasis characteristic of the horizontal pre-emphasis circuit 17. For example, the horizontal de-emphasis circuit 31 has a construction shown in FIG. 2B, and relatively attenuates a high-frequency component in the reproduced luminance signal compared to a low-frequency component. An output signal of the horizontal de-emphasis circuit 31 is passed through the lowpass filter 32, and is then supplied to a temporal de-emphasis circuit 33.

The temporal de-emphasis circuit 33 has a temporal de-emphasis characteristic complementary to the temporal pre-emphasis characteristic of the temporal pre-emphasis circuit 14. The temporal de-emphasis circuit 33 relatively attenuates the level of a high-frequency component in a temporal frequency of the reproduced luminance signal compared to a low-frequency component. The signal waveform of the reproduced luminance signal is returned to the original signal waveform in the temporal de-emphasis circuit 33, and an output signal of the temporal de-emphasis circuit 33 is supplied to a mixer 34.

On the other hand, the frequency converted carrier chrominance signal within the reproduced signal is separated in the lowpass filter 27, and the separated frequency converted carrier chrominance signal is supplied to a carrier chrominance signal processing circuit 35 wherein the signal format of the frequency converted carrier chrominance signal is returned to the original signal format and the frequency converted carrier chrominance signal is frequency-converted into a reproduced carrier chrominance signal in the original frequency band. The construction of the carrier chrominance signal processing circuit 35 itself is known in the VTR. The output reproduced carrier chrominance signal of the carrier chrominance signal processing circuit 35 is supplied to the mixer 34 and is mixed with the reproduced luminance signal from the temporal de-emphasis circuit 33. The mixer 34 produces a reproduced color video signal through an output terminal 36.

In FIG. 1A, the temporal pre-emphasis circuit 14 may be coupled in a stage subsequent to the horizontal pre-emphasis circuit 17. Similarly, the temporal de-emphasis circuit 33 shown in FIG. 1B may be coupled in a stage prior to the horizontal de-emphasis circuit 31. Further, in the apparatus according to the present invention, the horizontal pre-emphasis circuit 17 shown in FIG. 1A and the horizontal de-emphasis circuit 31 shown in FIG. 1B are not essential to the apparatus, and these circuits 17 and 31 may be omitted.

Figure 2B:
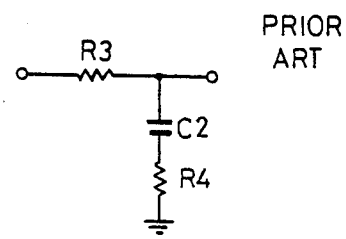
Figure 3A:
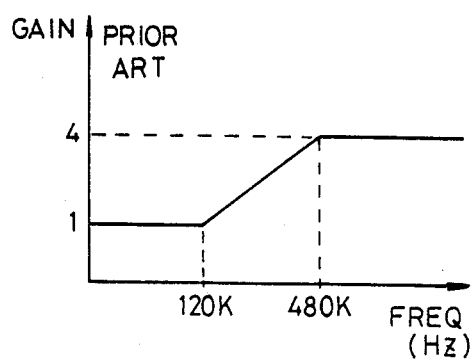
FIGS. 3A and 3B are graphs respectively showing the frequency response characteristics of the circuits shown in FIGS. 2A and 2B.
Figure 3B:
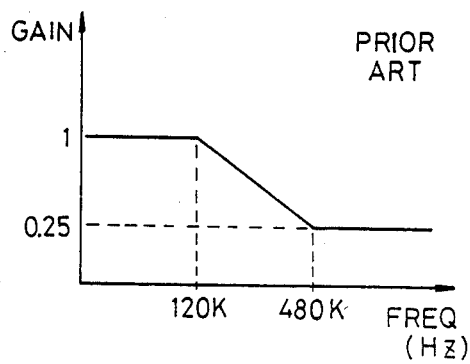
Figure 4:
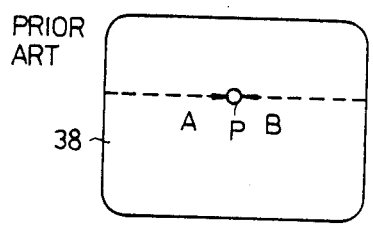
FIG. 4 is an illustration showing a picture for explaining the emphasis effect obtained in the conventional circuit.

A known de-emphasis circuit having a capacitor C2 and resistors R3 and R4 as shown in FIG. 2B, for example, may be used for the horizontal de-emphasis circuit 31. The de-emphasis circuit shown in FIG. 2B has a frequency response characteristic shown in FIG. 3B, and this circuit de-emphasizes the signal components in the high frequency range as compared to the signal components in the low frequency range by suppressing the signal components in the high frequency range. In FIGS. 3A and 3B, the slopes of the characteristic between frequencies $f_1$ and $f_2$ are respectively 6 dB/oct and $-6$ dB/oct.

Instead of the capacitor-resistor (CR) circuits shown in FIGS. 2A and 2B, a forward type transversal filter and a backward type transversal filter proposed in a U.S. patent application Ser. No. 534,638 filed Sept. 22, 1983 entitled "VIDEO SIGNAL PROCESSING SYSTEM", now U.S. Pat. No. 4,587,576 in which the assignee is the same as the assignee of the present application, may be used for the horizontal pre-emphasis circuit 17 and the horizontal de-emphasis circuit 31.

When the CR circuits shown in FIGS. 2A and 2B or the forward type transversal filter is used for the conventional horizontal pre-emphasis circuit 17 and the horizontal de-emphasis circuit 31, the noise is averaged and reduced in the emphasized signal. In other words, by subtracting from or adding to an original signal related to a predetermined point P in a reproduced picture 38, signals related to a plurality of points which are positionally lagging (to the left of the predetermined point P in the reproduced picture) with respect to the predetermined point P on a horizontal scanning line which includes the predetermined point P, the noise is averaged and reduced. On the other hand, when the backward type transversal filter is used for the conventional horizontal pre-emphasis circuit 17 and the horizontal de-emphasis circuit 31, the noise is averaged and reduced by subtracting from or adding to the original signal related to the predetermined point P in the reproduced picture 38, signals related to a plurality of points which are positionally advanced (to the right of the predetermined point P in the reproduced picture) with respect to the predetermined point P on the horizontal scanning line which includes the predetermined point P.

Thus, the horizontal pre-emphasis circuit 17 and the horizontal de-emphasis circuit 31 merely perform horizontal emphasis. The noise can be reduced satisfactorily in a case where the noise is in the form of a vertical line which is long in the vertical direction of the picture and has a short width in the horizontal direction of the picture, for example. The noise can be reduced satisfactorily in this case, since the frequency of the noise in the horizontal direction of the picture is high. On the other hand, in a case of a horizontal line noise which has a short width in the vertical direction of the picture and is long in the horizontal direction of the picture, the frequency of the noise in the horizontal direction of the picture is low. For this reason, the noise reducing effect is very poor with respect to the horizontal line noise, and the horizontal line noise can hardly be reduced.

A system for performing the pre-emphasis and the de-emphasis with respect to the vertical spatial frequency of the video signal, was proposed in a U.S. patent application Ser. No. 576,155 entitled "NOISE REDUCING SYSTEM FOR VIDEO SIGNAL" filed Feb. 2, 1984, now U.S. Pat. No. 4,607,285 in which the assignee is the same as the assignee of the present application. According to this proposed system, it is possible to reduce those noise which cannot be reduce by the horizontal emphasis described before. However, the noise still cannot be sufficiently reduced by such a vertical emphasis.

Accordingly, the recording and reproducing apparatus according to the present invention is designed to reduce those noise which cannot be reduced by the horizontal emphasis and the vertical emphasis. In the present embodiment of the invention, the temporal de-emphasis circuit 33 de-emphasized the temporal frequency versus level characteristic of the reproduced luminance signal. For this reason, the S/N ratio of the reproduced luminance signal can be improved. In addition, it is possible to prevent the temporal frequency versus level characteristic of the reproduced luminance signal from becoming deteriorated by the de-emphasis performed in the temporal de-emphasis circuit 33, since a pre-emphasis complementary to the de-emphasis is performed in the temporal pre-emphasis circuit 14 beforehand so as to emphasize the temporal frequency versus level characteristic. Thus, it is possible to improve the S/N ratio of the reproduced luminance signal without introducing a deterioration in the temporal frequency versus level characteristic of the reproduced luminance signal.

When the pre-emphasis is performed with respect to the temporal frequency, no problems occur in the case of a still picture or a moving picture containing a slow movement. However, in the case of a moving picture contains a high-speed movement or the scene in the picture is changed, an overshoot occurs and the picture quality becomes poor due to the information which is discarded by the white clipping and the dark clipping, as in the case of the horizontal emphasis and the vertical emphasis. However, as will be described later on in the specification, it is possible to reduce the information which is discarded, when the temporal pre-emphasis circuit 14 and the temporal de-emphasis circuit 32 have a non-linear characteristic such that the temporal frequency versus level characteristic changes depending on the level of the luminance signal. In this case where the the temporal pre-emphasis circuit 14 and the temporal de-emphasis circuit 32 have a non-linear characteristic, it is possible to prevent the picture quality from becoming deteriorated after the edge of the video signal, such as when the scene in the picture is changed. In addition, it is possible to maintain compatibility between the recording and reproducing apparatus according to the present invention and the existing VTR.

Figure 5:
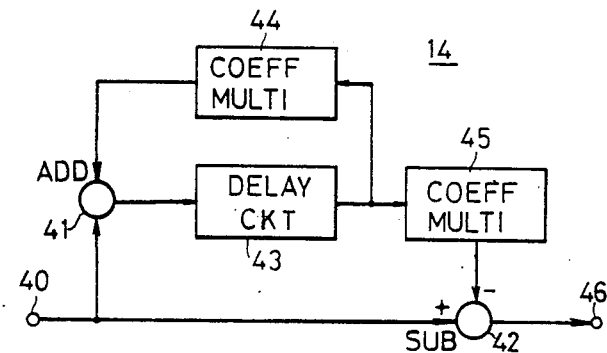
FIG. 5 is a systematic block diagram showing a first embodiment of a temporal pre-emphasis circuit in the block system shown in FIG. 1A.

Next, description will be given with respect to embodiments of the temporal pre-emphasis circuit 14 and the temporal de-emphasis circuit 33. FIG. 5 shows a first embodiment of the temporal pre-emphasis circuit 14. In FIG. 5, the luminance signal applied to an input terminal 40, is supplied to an adding circuit 41 and to a subtracting circuit 42. An output luminance signal of the adding circuit 41, is supplied to a delay circuit 43. Regardless of whether the luminance signal applied to the input terminal 40 is a luminance signal separated from an NTSC system color video signal or a PAL system color video signal, the delay circuit 43 has a delay time of 2 m fields, (2 m + 1) fields plus 0.5 H, or (2 m + 1) fields minus 0.5 H, where m=0, 1, 2, ... and H represents one horizontal scanning period. In the case of the luminance signal separated from the NTSC color video signal, one field of the luminance signal is equal to 262.5 H (312.5 H in the case of the PAL system). The phase is shifted by 0.5 H by a delay of an odd number of fields. Hence, the delay time is selected to a natural number multiple of one field or a time approximately equal to the natural number multiple of one field, which is a natural number multiple of the horizontal scanning period.

The delayed luminance signal from the delay circuit 43, is attenuated in a multiplying circuit (hereinafter referred to as coefficient multiplier) 44 which multiplies a coefficient of 0.76, for example, to the delayed luminance signal. An output signal of the coefficient multiplier 44 is supplied to the adding circuit 41 and is added with the luminance signal from the input terminal 40. The output signal of the adding circuit 41 is again supplied to the delay circuit 43. On the other hand, the output delayed luminance signal of the delay circuit 43 is also supplied to the subtracting circuit 42, through a multiplying circuit 45 having a coefficient of 0.14, for example. The subtracting circuit 42 subtracts the output luminance signal of the coefficient multiplier 45 from the input luminance signal which is obtained through the input terminal 40. In other words, the subtracting circuit 42 subtracts the luminance information of approximately a natural number multiple of one field, from the input luminance signal obtained through the input terminal 40, so as to obtain a pre-emphasized luminance signal in which a high-frequency component in the temporal frequency of the input luminance signal is relatively emphasized compared to a low-frequency component. The pre-emphasized luminance signal is produced through an output terminal 46.

A concrete circuit of the temporal pre-emphasis circuit 14 shown in FIG. 5, is shown in FIG. 6. In FIG. 6, the input luminance signal from the input terminal 40, is supplied to the adding circuits 41 and 42a, through a buffer circuit 50. The adding circuits 41 and 42a each comprise an operational amplifier and resistors $R_{12}$ and $R_{13}$. The buffer circuit 50 comprises an operational amplifier and a resistor $R_{11}$. The adding circuit 41 adds the input luminance signal which is obtained through the buffer circuit 50 and the output luminance signal of the coefficient multiplier 44 which comprises an operational amplifier and resistors $R_{14}$ and $R_{15}$. The output signal of the adding circuit 41 is supplied to the delay circuit 43 and is delayed by approximately a natural number multiple of one field. The output delayed luminance signal of the delay circuit 43, is passed through a buffer circuit (voltage follower) 51 which comprises an operational amplifier and a resistor $R_{11}$, and is supplied to the coefficient multipliers 44 and 45. The coefficient multiplier 45 comprises an operational amplifier and resistors $R_{16}$ and $R_{17}$. In the coefficient multiplier 44, the resistance of the variable resistor $R_{14}$ is adjusted so that the equation $(R_{14}+R_{15})/R_{15}=0.76$ is satisfied. In the coefficient multiplier 45, the resistance of the variable resistor $R_{17}$ is adjusted so that the equation $R_{16}/R_{17}=0.14$ is satisfied. The signal supplied to the coefficient multiplier 45, is multiplied by a coefficient and is reversed of the phase. The output signal of the coefficient multiplier 45, is supplied to the adding circuit 42a and is added with the input luminance signal which is obtained through the buffer circuit 50. Hence, a substantial subtraction takes place in the adding circuit 42a between the output luminance signal of the coefficient multiplier 45 and the input luminance signal which is obtained through the buffer circuit 50. The output signal of the adding circuit 42a is produced through the output terminal 46.

Next, description will be given with respect to the construction of the delay circuit 43. As described before, the delay circuit 43 has a delay time of approximately one field or a natural number multiple of one field. Thus, it is impossible to use an ultrasonic delay line having glass as the medium for this delay circuit 43, because such a long delay time cannot be obtained by the ultrasonic delay line. Further, a delay circuit which employs a charge transfer element and is capable of obtaining such a long delay time, is not yet available commercially. Accordingly, the delay circuit 43 is preferably constituted by a digital memory circuit. Although there will be no problem at the time of the recording, a problem occurs at the time of the reproduction when the delay time of the delay circuit for obtaining the long delay time is fixed. In other words, when the delay time of the delay circuit is fixed, the delay circuit cannot operate in the normal manner at the time of the reproduction due to the jitter included in the video signal. For this reason, the delay circuit 43 is constituted by a digital memory as shown in FIG. 7, and the delay time is variable depending on the jitter included in the video signal.

Figure 7:
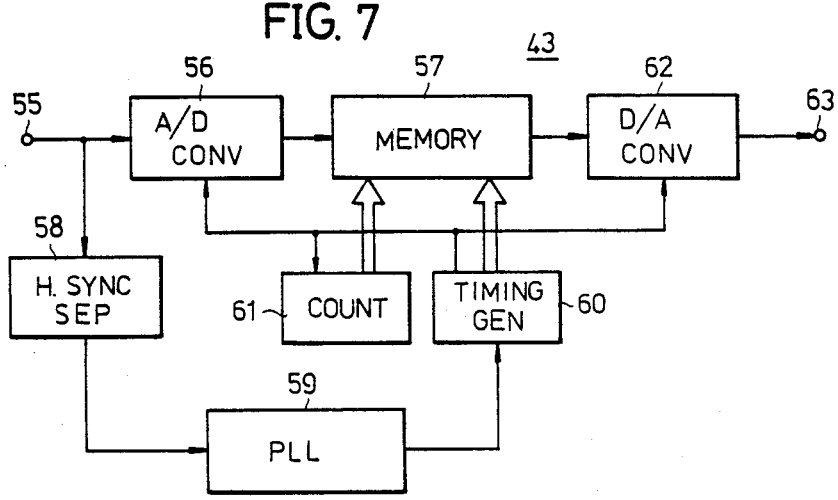
FIG. 7 is a systematic block diagram showing an embodiment of an essential part of the temporal pre-emphasis circuit in the block system shown in FIG. 1A.

In FIG. 7, the output signal of the adding circuit 41 is supplied to an analog-to-digital (A/D) converter 56, through an input terminal 55. The A/D converter 56 converts the input signal to a digital signal, and supplies an output digital signal to a memory circuit 57. The output signal of the adding circuit 41, is also supplied to a horizontal synchronizing signal separating circuit 58 through the input terminal 55. The horizontal synchronizing signal separating circuit 58 separates the horizontal synchronizing signal, and supplies the separated horizontal synchronizing signal to a phase locked loop (PLL) 59. The PLL 59 generates pulses in phase with the input horizontal synchronizing signal, and supplies the generated pulses to a timing generator 60. The pulses generated by the PLL 59 has a repetition frequency (for example, in the order of several MHz) which is a predetermined natural number multiple of the horizontal scanning frequency. The timing generator 60 supplies clock pulses having predetermined timings to the A/D converter 56, a counter 61, and a digital-to-analog (D/A) converter 62, responsive to the pulses from the PLL 59. Further, the timing generator 60 also supplies write-in and read-out clock pulses to the memory circuit 57.

The counter 61 counts the clock pulses from the timing generator 60, and supplies a counted output signal to the memory circuit 57 as an address signal. The memory circuit 57 successively transfers the input digital signal to each of the addresses designated by the address signal, and supplies to the D/A converter 62 a signal which is delayed by a predetermined delay time. The delay time is varied responsive to the jitter, since the output pulses of the PLL 59 vary responsive to the jitter in the input signal. The jitter essentially does not exist at the time of the recording. A delayed analog signal from the D/A converter 62, is produced through an output terminal 63.

Figure 8:
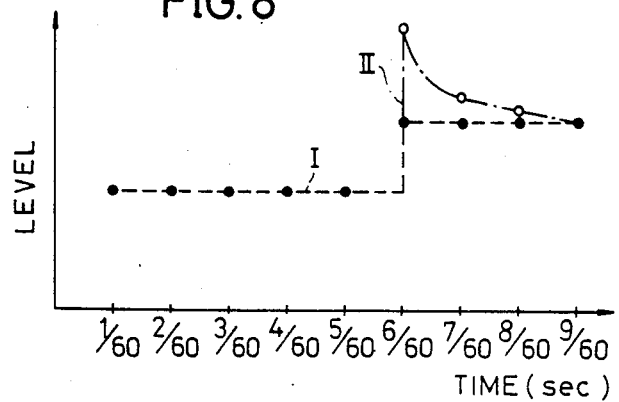
FIG. 8 is a graph showing the characteristic of the temporal pre-emphasis circuit in the block system shown in FIG. 1A.

The temporal pre-emphasis circuit 43 comprising the delay circuit 43 described above, performs a predetermined pre-emphasis by weighting and then adding the input luminance signal for every one field (1/60 seconds). In FIG. 8, black circular marks indicate the signal components of the input luminance signal for every certain one field. When it is assumed that the signal components vary as indicated by a broken line I in FIG. 8 and that the signal components are subjected to the temporal pre-emphasis in which the high-frequency component is relatively emphasized compared to the low-frequency component, an overshoot occurs in the pre-emphasized signal as indicated by a one-dot chain line II in FIG. 8. The signal components of the pre-emphasized signal are indicated by white circular marks.

Figure 9:
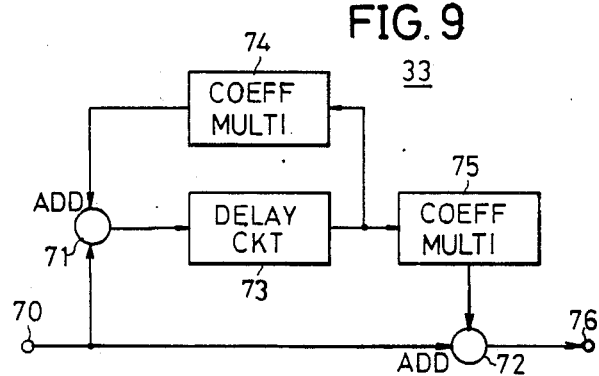
FIG. 9 is a systematic block diagram showing a first embodiment of a temporal de-emphasis circuit in the block system shown in FIG. 1B.

Next, description will be given with respect to a first embodiment of the de-emphasis circuit 33, by referring to FIG. 9. In FIG. 9, a reproduced luminance signal which is returned to the original signal format, is applied to an input terminal 70. This reproduced luminance signal is subjected to the temporal pre-emphasis described before at the time of the recording. The reproduced luminance signal is supplied to a delay circuit 73 through an adding circuit 71. The reproduced luminance signal is also supplied to an adding circuit 72. The delay circuit 73 has the same construction as the delay circuit 43 shown in FIG. 7, and has the same delay time as the delay circuit 43. An output delayed reproduced luminance signal of the delay circuit 43, is supplied to the adding circuit 71 through a coefficient multiplier 74 which multiplies a coefficient of 0.87, for example, and is also supplied to the adding circuit 72 through a coefficient multiplier 75 which multiplies a coefficient of 0.18, for example. An output signal of the adding circuit 71 is supplied to the delay circuit 73, and an output signal of the adding circuit 72 is produced through an output terminal 76.

The signal obtained through the output terminal 76, is a de-emphasized reproduced luminance signal in which the high-frequency component in the temporal frequency of the input reproduced luminance signal is relatively attenuated compared to the low-frequency component. That is, the reproduced luminance signal is subjected to a temporal de-emphasis which is complementary to the temporal pre-emphasis performed in the temporal pre-emphasis circuit 14 shown in FIG. 5. The de-emphasized reproduced luminance signal has a signal waveform which is restored and is essentially the same as the signal waveform of the input luminance signal applied to the input terminal 40 of the temporal pre-emphasis circuit 14.

As may be seen by comparing the temporal pre-emphasis circuit 14 shown in FIG. 5 and the temporal de-emphasis circuit 33 shown in FIG. 9, the circuit constructions of the two circuits are essentially the same. The only difference between the two circuits, is that the coefficients of the coefficient multipliers 44, 45, 74, and 75 are different, and that a circuit corresponding to the subtracting circuit 42 in the temporal pre-emphasis circuit 14 is the adding circuit 72 in the temporal de-emphasis circuit 33. Accordingly, in the description which follow, the illustration of the temporal de-emphasis circuit 33 or a temporal de-emphasis circuit 96 which will be described later on in the specification, will be omitted where possible.

Figure 10:
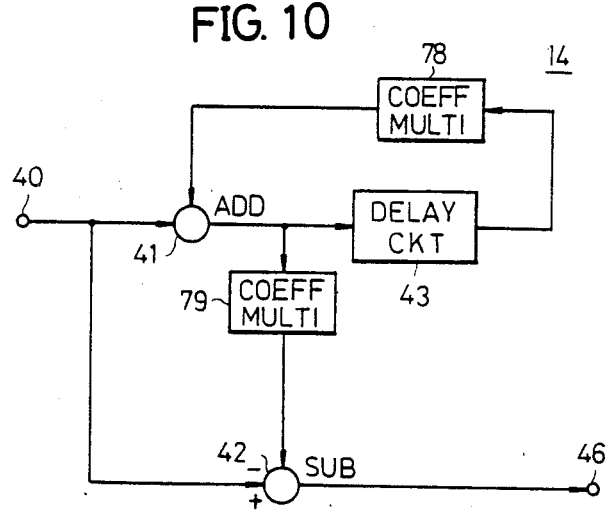
FIG. 10 is a systematic block diagram showing a second embodiment of the temporal pre-emphasis circuit shown in FIG. 1A.

Next, description will be given with respect to a second embodiment of the temporal pre-emphasis circuit 14 by referring to FIG. 10. In FIG. 10, those parts which are the same as those corresponding parts in FIG. 5 are designated by the same reference numerals, and their description will be omitted. A coefficient multiplier 79 is supplied with a part of the luminance signal which is supplied from the adding circuit 41 to the delay circuit 43. The coefficient multiplier 79 multiplies a coefficient of 0.14, for example, and supplies an output signal to the subtracting circuit 42. A coefficient multiplier 78 multiplies a coefficient of 0.76, for example, to the output delayed luminance signal of the delay circuit 43, and supplies an output signal to the adding circuit 41. In this second embodiment, unlike in the first embodiment described before, the delay circuit 43 is not located in the signal path which starts from the input terminal 40 and reaches the output terminal 46 through the subtracting circuit 42.

The temporal de-emphasis circuit 33 having a temporal de-emphasis characteristic complementary to the temporal pre-emphasis characteristic of the temporal pre-emphasis circuit 14 shown in FIG. 10, is constructed similarly to the circuit shown in FIG. 10. In the case of the temporal de-emphasis circuit 33, the coefficients of coefficient multipliers corresponding to the coefficient multipliers 78 and 79 are respectively selected to 0.87 and 0.18, for example. Further, a circuit corresponding to the subtracting circuit 42, is an adding circuit for the case of the temporal de-emphasis circuit 33. Due to these minor differences between the temporal de-emphasis circuit 33 having the temporal de-emphasis characteristic complementary to the temporal pre-emphasis characteristic of the temporal pre-emphasis circuit 14 shown in FIG. 10, and the temporal pre-emphasis circuit 14, the illustration of the temporal de-emphasis circuit 33 will be omitted.

Figure 11:
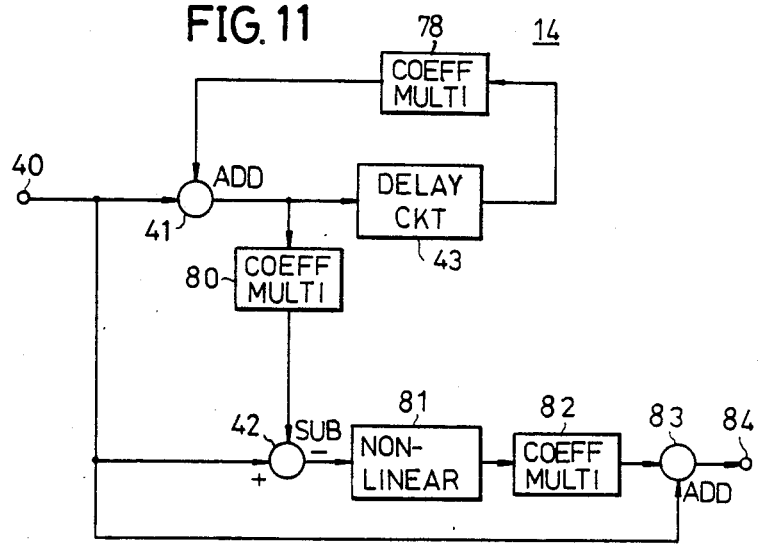
FIG. 11 is a systematic block diagram showing a third embodiment of the temporal pre-emphasis circuit in the block system shown in FIG. 1A.

Next, description will be given with respect to a third embodiment of the temporal pre-emphasis circuit 14, by referring to FIG. 11. In FIG. 11, those parts which are the same as those corresponding parts in FIG. 10 will be designated by the same reference numerals, and their description will be omitted. In FIG. 11, a coefficient multiplier 80 multiplies a coefficient of 0.24, for example, to the output signal of the adding circuit 41. The coefficient multiplier 80 corresponds to the coefficient multiplier 79 shown in FIG. 10, and supplies an output signal to the subtracting circuit 42. The output luminance signal of the subtracting circuit 42 is supplied to a non-linear circuit 81. For example, the non-linear circuit 81 is an amplitude limiter for limiting the amplitude of the input signal to a predetermined level. The non-linear circuit 81 is designed to perform no amplitude limitation with respect to the input signal having an amplitude smaller than the predetermined level.

Figure 12:
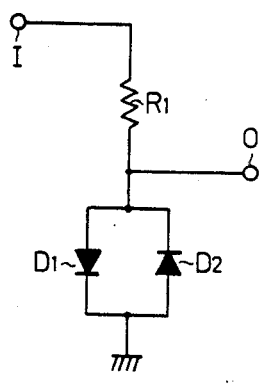
FIG. 12 is a circuit diagram showing an example of a non-linear circuit.

FIG. 12 is a circuit diagram showing the non-linear circuit described above. In FIG. 12, an input terminal I is coupled to an anode of a diode $D_1$ and to a cathode of a diode $D_2$, through a resistor $R_1$. A cathode of the diode $D_1$ and an anode of the diode $D_2$ are respectively grounded. A common connection point of the resistor $R_1$ and the diodes $D_1$ and $D_2$, is coupled to an output terminal O. The circuit construction of the non-linear circuit itself shown in FIG. 12, is known.

Figure 13:
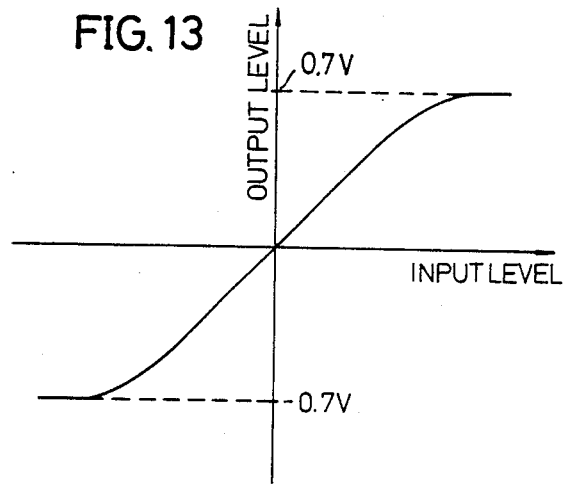
FIG. 13 is a graph showing an input versus output characteristic of the non-linear circuit shown in FIG. 12.

The diode $D_1$ is turned ON when an input voltage applied to the input terminal I is greater than a forward drop voltage of 0.7 volts of the diode $D_1$. Hence, the input voltage greater than or equal to 0.7 volts, is subjected to an amplitude limitation and is produced through the output terminal O. On the other hand, when the diode $D_2$ is turned ON when the input voltage is less than the forward drop voltage of 0.7 volts of the diode $D_2$. Hence, the input voltage of less than −0.7 volts, is amplitude limited to −0.7 volts and is produced through the output terminal O. When the input voltage assumes a level between +0.7 volts and −0.7 volts, the diodes $D_1$ and $D_2$ remain OFF, and the input voltage is produced through the output terminal O without being subjected to the amplitude limitation. Accordingly, an input versus output characteristic of the non-linear circuit having the construction shown in FIG. 12, becomes as shown in FIG. 13.

The output signal of the non-linear circuit 81 is supplied to a coefficient multiplier 82 which multiplies a coefficient of 1.3, for example. An output signal of the coefficient multiplier 82 is supplied to an adding circuit 83 and is added with the input luminance signal obtained through the input terminal 40. An output luminance signal of the adding circuit 83, is produced through an output terminal 84.

Therefore, a pre-emphasized luminance signal in which the high-frequency component in the temporal frequency of the input luminance signal is relatively emphasized compared to the low-frequency component, is obtained through the output terminal 84.

Figure 14A:
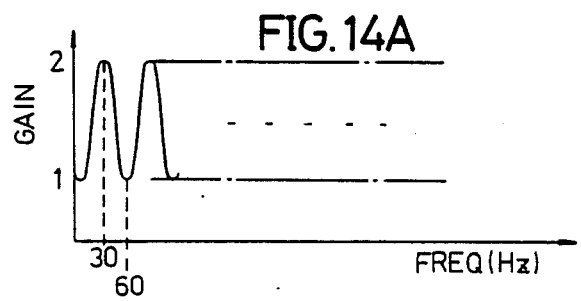
FIGS. 14A and 14B are graphs respectively showing an example of the frequency characteristic of the pre-emphasis circuit shown in FIG. 11.
Figure 14B:
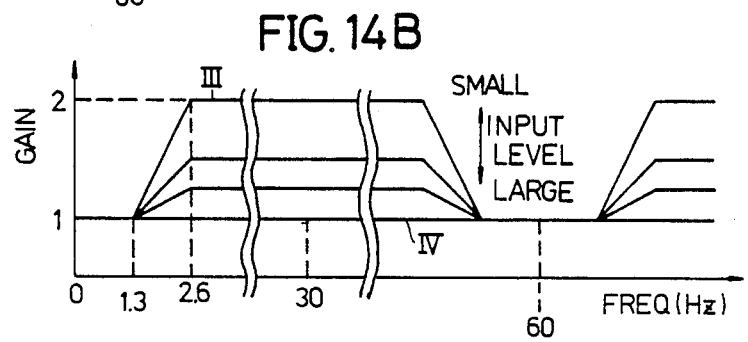

The frequency characteristic of the embodiments of the temporal pre-emphasis circuit 14 shown in FIGS. 5, 10, and 11, is shown in FIG. 14A. The frequency characteristic shown in FIG. 14A is a comb filter characteristic in which a dip occurs at a frequency which is an even number multiple of ½ the field frequency (the field frequency is equal to 60 Hz in this case, and ½ the field frequency is a frame frequency of 30 Hz) of the input video signal, and a peak occurs at a frequency which is an odd number multiple of the frame frequency. The temporal pre-emphasis circuit 14 utilizes a part of the frequency characteristic shown in FIG. 14A. However, in the first and second embodiments shown in FIGS. 5 and 10, the temporal pre-emphasis is always performed with a constant pre-emphasis characteristic shown in FIG. 14A regardless of the level of the input luminance signal. On the other hand, in the third embodiment shown in FIG. 11, the temporal pre-emphasis is performed with a pre-emphasis characteristic depending on the level of the input luminance signal. In other words, in the case of the third embodiment, the pre-emphasis is performed with a pre-emphasis characteristic shown in FIG. 14B which shows a part of FIG. 14A in an enlarged scale. As shown in FIG. 14B, the pre-emphasis quantity is a maximum as indicated by III when the input luminance signal assumes a minimum level, and the pre-emphasis quantity decreases as the level of the input luminance signal increases. As shown in FIG. 14B, the pre-emphasis quantity is a minimum in the third embodiment when the input luminance signal assumes a maximum level, and the pre-emphasis is not performed as indicated by IV. Accordingly, in the case of the temporal pre-emphasis circuit 14 having the non-linear pre-emphasis characteristic, the overshoot indicated by the one-dot chain line II in FIG. 8 will hardly occur when the temporal pre-emphasis is performed with respect to the input signal which has a sharp level change from a small level to a large level (for example, a change from a dark picture to a bright picture) as indicated by the broken line I in FIG. 8. Therefore, the first and second embodiments shown in FIGS. 5 and 10 and the third embodiment shown in FIG. 11 are all feed forward type temporal pre-emphasis circuits, however, the first and second embodiments each have a linear pre-emphasis characteristic and the third embodiment has a non-linear pre-emphasis characteristic.

Figure 15:
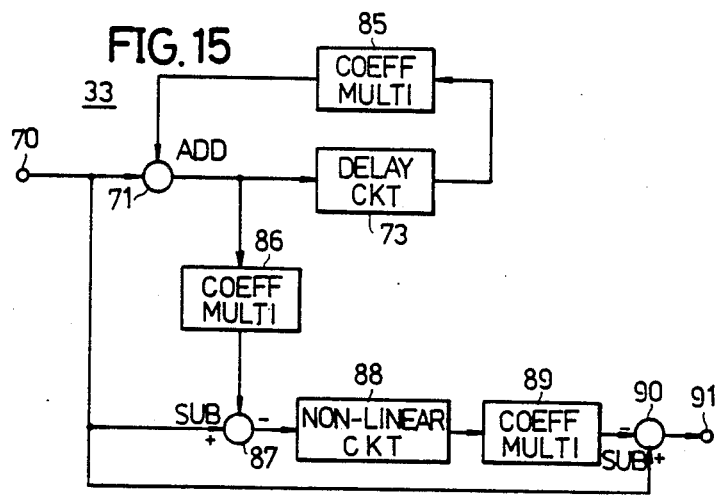
FIG. 15 is a systematic block diagram showing a second embodiment of the temporal de-emphasis circuit in the block system shown in FIG. 1B.

In the case where the circuit shown in FIG. 11 is used as the temporal pre-emphasis circuit 14, a circuit shown in FIG. 15 having a de-emphasis characteristic complementary to the pre-emphasis characteristic of the circuit shown in FIG. 11 is used as the de-emphasis circuit 33. In FIG. 15, those parts which are the same as those corresponding parts in FIG. 9 are designated by the same reference numerals, and their description will be omitted. In FIG. 15, coefficient multipliers 85, 86, and 89 respectively have coefficients of 0.87, 0.13, and 0.57. A subtracting circuit 87 subtracts an output signal of the coefficient multiplier 86 from the input reproduced luminance signal which is obtained through the input terminal 70. An output signal of the subtracting circuit 87 is passed through a non-linear circuit 88 having the construction shown in FIG. 12 and the coefficient multiplier 89, and is supplied to a subtracting circuit 90. The subtracting circuit 90 subtracts the output signal of the coefficient multiplier 89 from the input reproduced luminance signal which is obtained from the input terminal 70. A reproduced luminance signal which is subjected to the de-emphasis with respect to the temporal frequency of the input reproduced luminance signal, is produced through an output terminal 91.

Figure 16A:
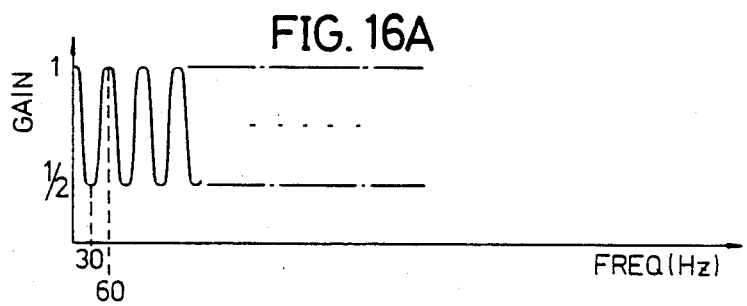
FIGS. 16A and 16B are graphs respectively showing an example of the frequency characteristic of the de-emphasis circuit shown in FIG. 15.
Figure 16B:
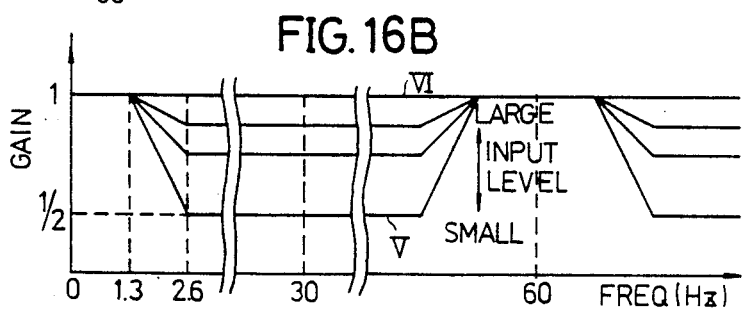

The frequency characteristic of the embodiments of the temporal de-emphasis circuit 33 shown in FIGS. 9, and 15, is shown in FIG. 16A. The frequency characteristic shown in FIG. 16A is a comb filter characteristic in which a peak occurs at a frequency which is an even number multiple of ½ the field frequency (the field frequency is equal to 60 Hz in this case, and ½ the field frequency is a frame frequency of 30 Hz) of the input video signal, and a dip occurs at a frequency which is an odd number multiple of the frame frequency. The temporal de-emphasis circuit 3 utilizes a part of the frequency characteristic shown in FIG. 16A. However, in the first embodiment shown in FIG. 9, the temporal de-emphasis is always performed with a constant de-emphasis characteristic shown in FIG. 16A regardless of the level of the input luminance signal. On the other hand, in the second embodiment shown in FIG. 15, the temporal de-emphasis is performed with a de-emphasis characteristic depending on the level of the input luminance signal. In other words, in the case of the second embodiment, the de-emphasis is performed with a de-emphasis characteristic shown in FIG. 16B which shows a part of FIG. 16A in an enlarged scale. As shown in FIG. 16B, the de-emphasis quantity is a maximum as indicated by V when the input luminance signal assumes a minimum level, and the de-emphasis quantity decreases as the level of the input luminance signal increases. As shown in FIG. 16B, the de-emphasis quantity is a minimum in the second embodiment when the input luminance signal assumes a maximum level, and the de-emphasis is not performed as indicated by VI.

Figure 17A:
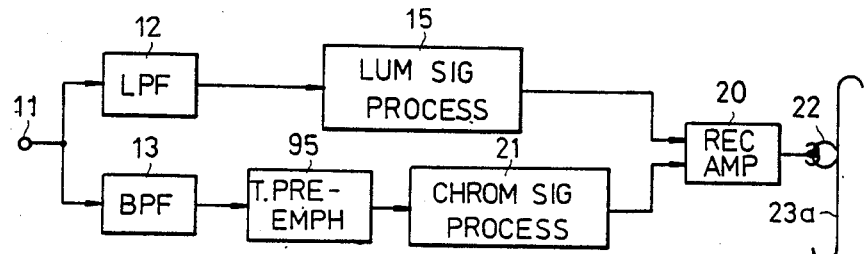
FIGS. 17A and 17B are systematic block diagrams respectively showing a second embodiment of the recording system and the reproducing system in the recording and reproducing apparatus according to the present invention.
Figure 17B:
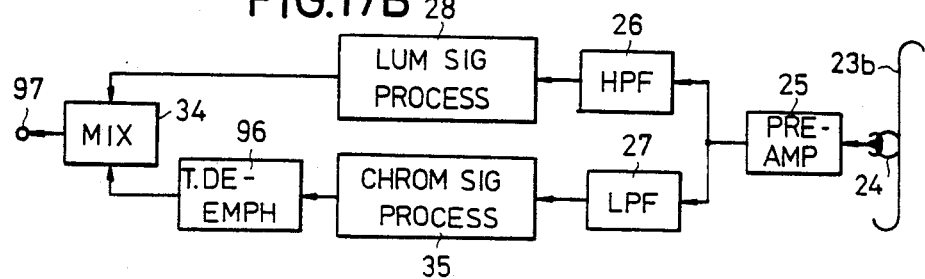

The recording and reproducing apparatus described heretofore has the temporal pre-emphasis circuit 14 and the temporal de-emphasis circuit 33 located in the transmission path of the luminance signal. Next, description will be given with respect to a second embodiment of the recording and reproducing apparatus according to the present invention, by referring to FIGS. 17A and 17B. In FIGS. 17A and 17B, those parts which are the same as those corresponding parts in FIGS. 1A and 1B are designated by the same reference numerals, and their description will be omitted. In this second embodiment of the invention, a temporal pre-emphasis circuit 95 shown in FIG. 17A relatively emphasizes the level of the high-frequency component in the temporal frequency of an input carrier chrominance signal which is received through the input terminal 11 and the bandpass filter 13 compared to the low-frequency component, regardless of the level of the input carrier chrominance signal. An output carrier chrominance signal of the temporal pre-emphasis circuit 95 is supplied to the carrier chrominance signal processing circuit 21. The temporal de-emphasis circuit 96 shown in FIG. 17B performs a temporal de-emphasis complementary to the temporal pre-emphasis performed in the temporal pre-emphasis circuit 95 at the time of the recording, with respect to the output reproduced carrier chrominance signal of the carrier chrominance signal processing circuit 35.

According to this second embodiment of the invention, the effect of improving the S/N ratio of the luminance signal in the first embodiment of the invention, is similarly obtained with respect to the carrier chrominance signal. In other words, the S/N ratio of the carrier chrominance signal is improved.

Figure 18:
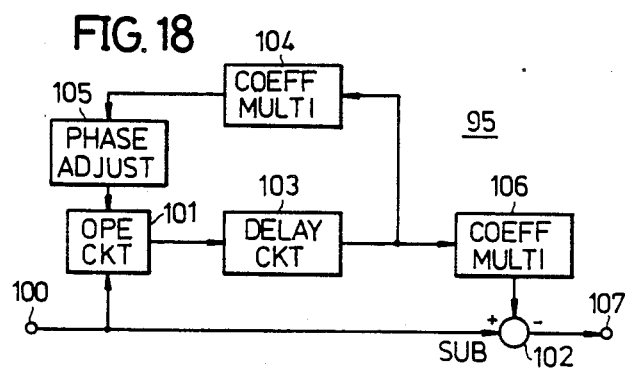
FIG. 18 is a systematic block diagram showing a first embodiment of a temporal pre-emphasis circuit in the block system shown in FIG. 17A.

Description will now be given with respect to embodiments of the temporal pre-emphasis circuit 95 and the temporal de-emphasis circuit 96 which are located in the transmission path of the carrier chrominance signal. FIG. 18 shows a first embodiment of the temporal pre-emphasis circuit 95. In FIG. 18, the input carrier chrominance signal applied to an input terminal 100, is supplied to a delay circuit 103 through an operation circuit 101. The input carrier chrominance signal is also applied to a subtracting circuit 102. In the case where the input carrier chrominance signal is a signal separated from the NTSC system color video signal, the chrominance subcarrier frequency is equal to 227.5 times the horizontal scanning frequency, as is well known. Hence, due to the fraction of 0.5, the chrominance subcarrier has a phase difference of 0.5 periods, that is, 180°, between the beginning and end of 1H. In addition, one field is equal to 262.5H, and the phase of carrier chrominance signals having a mutual time difference of an odd number of fields shifts by 0.5H. For this reason, the two signals which are subjected to the operation in the operation circuit 101 (same for the case of an operation circuit 111 which will be described later on in the specification) must be added or subtracted in phase.

The relationship between the delay time of the delay circuit 103 and whether the operation in the operation circuit 101 is an addition or a subtraction, becomes as follows. In a first case (i) where the delay time of the delay circuit 103 is equal to 4 m fields (=2 m frames), the operation circuit 101 performs an addition because 4 m fields is equal to 1050 mH which is an even number multiple of H. In a second case (ii) where the delay time of the delay circuit 103 is equal to (4 m+1) fields minus 0.5H, or in a third case (iii) where the delay time of the delay circuit 103 is equal to (4 m+3) fields plus 0.5H, the delay time is an even multiple of H, and the operation circuit 101 performs an addition. On the other hand, in a fourth case (iv) where the delay time of the delay circuit 103 is equal to (4 m+1) fields plus 0.5H, a fifth case (v) where the delay time is equal to (4 m+2) fields (=2 m+1 frames), or a sixth case (vi) where the delay time is equal to (4 m=3) fields minus 0.5H, the operation circuit 101 performs a subtraction since the delay time is an odd number multiple of H. An output delayed carrier chrominance signal of the delay circuit 103 having one of the delay times under the cases (i) through (vi) described above, is multiplied by a coefficient in a coefficient multiplier 104. The coefficient of the coefficient multiplier 104 is the same as the coefficient of the coefficient multiplier 44 described before. An output carrier chrominance signal of the coefficient multiplier 104 is supplied to the operation circuit 101 through a phase adjuster 105, and is subjected to an addition or a subtraction with the input carrier chrominance signal which is obtained through the input terminal 100. The phase adjuster 105 may be omitted if one of the delay times under the cases (i) through (vi) can be obtained accurately. However, in reality, the actual delay time of the delay circuit 103 depends on the circuit and the actual delay time differs for each delay circuit. Hence, when the delay circuit 103 having an error in the actual delay time is employed and the output of the coefficient multiplier 104 is directly supplied to the operation circuit 101, the temporal pre-emphasis circuit 95 operates as if the coefficient multiplier 104 has a coefficient different from a predetermined value, and the desired temporal pre-emphasis cannot be performed.

Accordingly, the phase adjuster 105 is designed to adjust the phase of the output signal of the coefficient multiplier 104, so that the phase becomes equal to the phase of the carrier chrominance signal which is accurately delayed by a predetermined delay time. This predetermined delay time is a natural number multiple of one field or by a delay time in the vicinity thereof, and is a natural number multiple of H. The desired temporal pre-emphasis can be performed due to the provision of the phase adjuster 105.

The phase adjuster 105 and a phase adjuster 114 which will be described later on in the specification, have a circuit construction shown in FIG. 22A or 22B. FIG. 22A shows a phase adjuster employing an operational amplifier 131. In FIG. 22A, an input terminal 130 is coupled to a non-inverting input terminal of the operational amplifier 131 through a resistor $R_{20}$. The input terminal 130 is also coupled to an inverting input terminal of the operational amplifier 131, through a circuit which is made up of a capacitor $C_{20}$ and a variable resistor $VR_1$. An output terminal of the operational amplifier 131 is coupled to a feedback resistor $R_{21}$ and to an output terminal 132.

On the other hand, the phase adjuster may have the circuit construction shown in FIG. 22B. In FIG. 22B, the phase adjuster comprises a bipolar transistor $T_r$, a collector resistor $R_{31}$, an emitter resistor $R_{32}$, a coil L, a capacitor C, and a variable resistor $VR_2$.

The output delayed carrier chrominance signal of the delay circuit 103 is supplied to a coefficient multiplier 106 and is multiplied by a coefficient which is the same as the coefficient of the coefficient multiplier 45 described before. An output signal of the coefficient multiplier 106 is supplied to the subtracting circuit 102. The subtracting circuit 102 subtracts the output carrier chrominance signal of the coefficient multiplier 106 from the input carrier chrominance signal which is obtained through the input terminal 100. The output signal of the subtracting circuit 102 is produced through an output terminal 107 as the pre-emphasized carrier chrominance signal. In the pre-emphasized carrier chrominance signal obtained through the output terminal 107, the level of the high-frequency component in the temporal frequency of the input carrier chrominance signal is relatively emphasized compared to the low-frequency component. In other words, the input carrier chrominance signal is emphasized with the pre-emphasis characteristic shown in FIG. 14A, and the pre-emphasized carrier chrominance signal which is obtained through the output terminal 107 is produced as the output of the temporal pre-emphasis circuit 95.

Figure 19:
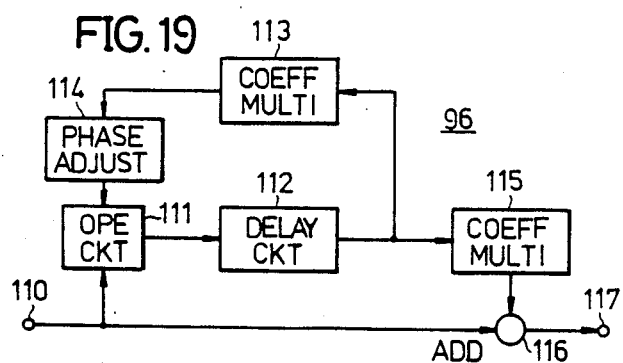
FIG. 19 is a systematic block diagram showing an embodiment of a temporal de-emphasis circuit in the block system shown in FIG. 17B.

Next, description will be given with respect to an embodiment of the temporal de-emphasis circuit 96, by referring to FIG. 19. In FIG. 19, a reproduced carrier chrominance signal which is returned to the original frequency band is applied to an input terminal 110. The reproduced carrier chrominance signal is supplied to an operation circuit 111 and to an adding circuit 116. An output signal of the operation circuit 111 is fed back to the operation circuit 111, through a delay circuit 112 having the same delay time as the delay circuit 103 described before, a coefficient multiplier 113, and the phase adjuster 114. An output signal of the delay circuit 112 is also supplied to the adding circuit 116 through a coefficient multiplier 115. The phase adjuster 114 is provided in order to obtain an accurate delay, as in the case of the phase adjuster 105 described before. The coefficient multiplier 113 has a coefficient of 0.87, for example, and the coefficient multiplier 115 has a coefficient of 0.18, for example.

The adding circuit 116 adds the reproduced carrier chrominance signal which is obtained through the input terminal 110, and the reproduced carrier chrominance signal which is obtained through the coefficient multiplier 115. An output signal of the adding circuit 116 is produced through an output terminal 117 as the de-emphasized reproduced carrier chrominance signal. In the de-emphasized reproduced carrier chrominance signal obtained through the output terminal 117, the level of the high-frequency component in the temporal frequency of the input reproduced carrier chrominance signal is relatively attenuated compared to the low-frequency component. In other words, the input reproduced carrier chrominance signal is de-emphasized with the de-emphasis characteristic shown in FIG. 16A, and the de-emphasized reproduced carrier chrominance signal which is obtained through the output terminal 117 is produced as the output of the temporal de-emphasis circuit 96.

The constructions of the temporal pre-emphasis circuit 95 and the temporal de-emphasis circuit 96 are basically the same as the constructions of the temporal pre-emphasis circuit 14 and the temporal de-emphasis circuit 33. The circuits 95 and 96 are different from the circuits 14 and 33, in that in the circuits 95 and 96, the circuits located at the input side of the delay circuits 103 and 112 are the operation circuits 101 and 111 which perform addition or subtraction depending on the predetermined delay times of the delay circuits 103 and 112. Further, in the circuits 95 and 96, the phase adjusters 105 and 114 are provided unlike in the circuits 14 and 33.

FIG. 20 shows the temporal pre-emphasis circuit 95 corresponding to the temporal pre-emphasis circuit 14 shown in FIG. 10. In FIG. 20, those parts which are the same as those corresponding parts in FIG. 18 are designated by the same reference numerals, and their description will be omitted. In FIG. 20, multiplying circuits 120 and 121 multiply the input signal, coefficients which are respectively the same as the coefficients of the coefficient multipliers 78 and 79. FIG. 21 shows the temporal pre-emphasis circuit 95 corresponding to the temporal pre-emphasis circuit 14 shown in FIG. 11. In FIG. 21, those parts which are the same as those corresponding parts in FIG. 18 are designated by the same reference numerals, and their description will be omitted. In FIG. 21, coefficient multiplying circuits 120, 122, and 124 respectively have the same coefficients as the coefficient multipliers 78, 80, and 82. A non-linear circuit 123 has the construction shown in FIG. 12. A carrier chrominance signal which is subjected to the non-linear pre-emphasis described before in conjunction with FIG. 11, is obtained from an adding circuit 125 and is produced through an output terminal 126.

The embodiments of the temporal pre-emphasis circuits 14 and 95 and the embodiments of the temporal de-emphasis circuits 33 and 96, are all feed forward type circuits. Next, description will be given with respect to a feedback type pre-emphasis circuit and a feedback type de-emphasis circuit.

Figure 23:
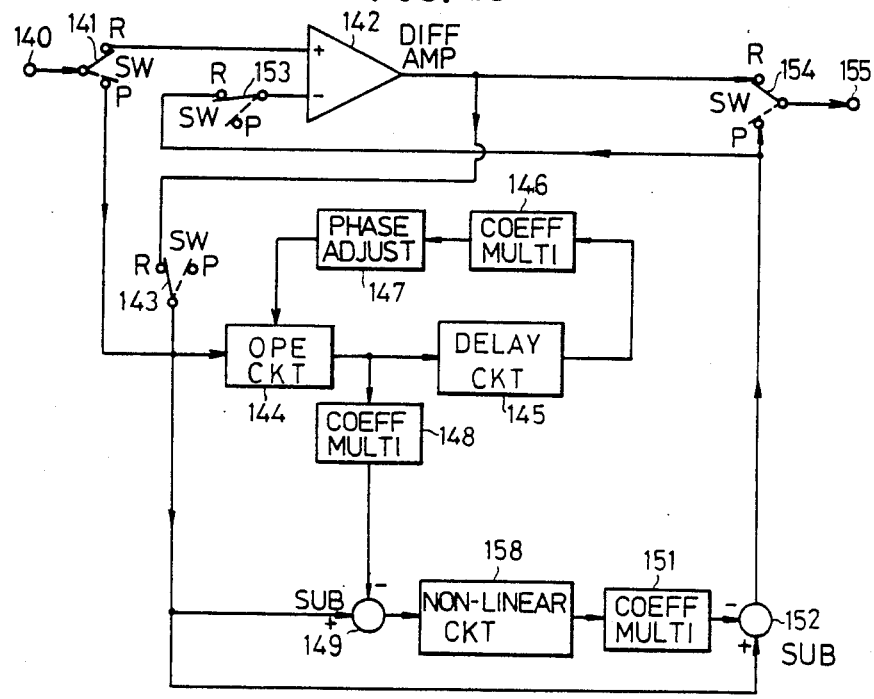
FIG. 23 is a circuit diagram showing an embodiment of a circuit which is commonly used as the temporal pre-emphasis circuit and the temporal de-emphasis circuit.

FIG. 23 shows a circuit which is commonly used as the temporal pre-emphasis circuit 95 and the temporal de-emphasis circuit 96. At the time of the reproduction, switches 141, 143, 153, and 154 are connected to respective terminals P. Hence, the reproduced carrier chrominance signal applied to an input terminal 140, is supplied to an operation circuit 144 through the switch 141. An output signal of the operation circuit 144 is fed back to the operation circuit 144, through a delay circuit 145, a coefficient multiplier 146, and a phase adjuster 147. The operation circuit 144 performs a subtraction or an addition between the output reproduced carrier chrominance signal of the phase adjuster 147 and the reproduced carrier chrominance signal which is obtained through the switch 141. Compared to the output reproduced carrier chrominance signal of the phase adjuster 147, the reproduced carrier chrominance signal which is obtained through the switch 141 is timewise after the output reproduced carrier chrominance signal of the phase adjuster 147 by a period which is approximately equal to a natural number multiple of one field and is a natural number multiple of H. The output signal of the operation circuit 144 is also supplied to a subtracting circuit 149 through a coefficient multiplier 148. The subtracting circuit 149 subtracts the output carrier chrominance signal of the coefficient multiplier 148 from the reproduced carrier chrominance signal which is obtained through the switch 141. An output signal of the subtracting circuit 149 is passed through a non-linear circuit 150 and a coefficient multiplier 151, and is supplied to a subtracting circuit 152. The subtracting circuit 152 subtracts the output signal of the coefficient multiplier 151 from the reproduced carrier chrominance signal which is obtained through the switch 141. Accordingly, the reproduced carrier chrominance signal is de-emphasized with the non-linear de-emphasis characteristic shown in FIG. 16B, and a reproduced de-emphasized carrier chrominance signal is produced from the subtracting circuit 152. This reproduced de-emphasized carrier chrominance signal from the subtracting circuit 152, is passed through the switch 154, and is produced through an output terminal 155. According to this embodiment, the possibility of the signal waveform not being restored to the original signal waveform due to the de-emphasis, is reduced by the provision of the non-linear circuit 150 (for example, there is an error of only 1/G when the gain of the differential amplifier 142 is set to G).

On the other hand, at the time of the recording, the switches 141, 143, 153, and 154 are connected to respective terminals R. Accordingly, the carrier chrominance signal applied to the input terminal 140, is supplied to the operation circuit 144 through the switch 141, the differential amplifier 142, and the switch 142. The output signal of the operation circuit 144 is fed back to the operation circuit 144, through the delay circuit 145, the coefficient multiplier 146, and the phase adjuster 147. The relationship between the delay time of the delay circuit 145 and the operation (addition or subtraction) in the operation circuit 144, is the same as the relationship between the delay time of the delay circuit 103 and the operation of the operation circuit 101. The output carrier chrominance signal of the operation circuit 144 is also supplied to the subtracting circuit 149 through the coefficient multiplier 148. The subtracting circuit 149 subtracts the output signal of the coefficient multiplier 144 from the carrier chrominance signal which is obtained through the switch 143, and supplies an output signal to the non-linear circuit 150.

The construction of the non-linear circuit 150 is the same as the constructions of the non-linear circuits 81 and 123. The large level portion of the output carrier chrominance signal of the subtracting circuit 149, which is greater than the predetermined level, is subjected to the amplitude limitation in the non-linear circuit 150. The output signal of the non-linear circuit 150 is supplied to the subtracting circuit 152 through the coefficient multiplier 151, and is subtracted from the carrier chrominance signal which is obtained through the switch 143. In this case, the circuit shown in FIG. 23 obtains a pre-emphasis characteristic complementary to the de-emphasis characteristic of the de-emphasis circuit at the time of the reproduction, by inserting the de-emphasis circuit in a feedback loop of the differential amplifier 142. Thus, the carrier chrominance signal which is produced from the differential amplifier 142 and is obtained through the switch 154 and the output terminal 155, is a signal which is pre-emphasized with the non-linear pre-emphasis characteristic shown in FIG. 14B. For example, the coefficients of the coefficient multipliers 146, 148, and 151 are respectively equal to 0.87, 0.13, and 0.57.

The following table shows the relationship between the circuit types of the embodiments of the pre-emphasis circuits and de-emphasis circuits in the recording and reproducing apparatus according to the present invention, and the figures which show the embodiments.

TABLE

|  | Luminance signal | | Carrier chrominance signal | |
| --- | --- | --- | --- | --- |
|  | Linear | Non-linear | Linear | Non-linear |
| Feed forward type | FIG. 5 |  | FIG. 18 |  |
|  | FIG. 9 | FIG. 11 | FIG. 19 | FIG. 21 |
|  | FIG. 10 | FIG. 15 | FIG. 20 |  |

TABLE-continued

|  | Luminance signal | | Carrier chrominance signal | |
| --- | --- | --- | --- | --- |
|  | Linear | Non-linear | Linear | Non-linear |
| Feedback type | (a) | (b) | (c) | FIG. 23 |

The illustration of a pre-emphasis circuit and a de-emphasis circuit of the types (a), (b), and (c) shown in the table shown above, is omitted. However, the circuits of the types (a), (b), and (c) are also within the scope of the present invention. For example, the pre-emphasis circuit and the de-emphasis circuit of the type (c) can be designed by omitting the non-linear circuit 150, the coefficient multiplier 151, and the subtracting circuit 152 from the circuit shown in FIG. 23, and by connecting the output terminal of the coefficient multiplier 149 to the terminal R of the switch 153 and the terminal P of the switch 154. The pre-emphasis circuit and the de-emphasis circuit of the type (b) can be designed by omitting the phase adjuster 147 from the circuit shown in FIG. 23, by setting the delay time of the delay circuit 145 to the same delay time as the delay circuit 43, by employing an adding circuit instead of the operation circuit 144, and by applying the luminance signal to the input terminal 140. The pre-emphasis circuit and the de-emphasis circuit of the type (a) can be readily understood from the description given with respect to the types (c) and (b), and the description on the type (a) will be omitted.

In FIG. 23, it is possible to obtain a de-emphasis characteristic by inserting into the feedback loop of the differential amplifier 142 the pre-emphasis circuit having the construction shown in FIG. 21.

Figure 17C:
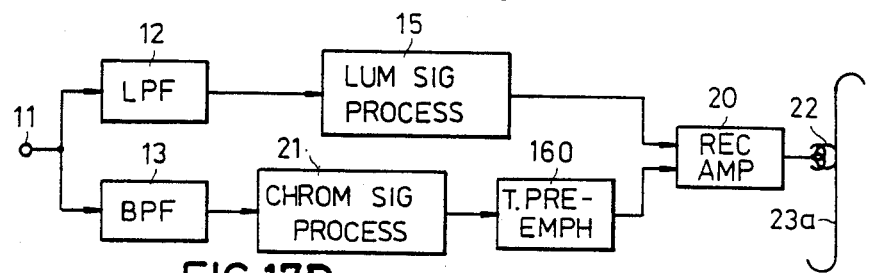
FIGS. 17C and 17D are systematic block diagrams respectively showing a third embodiment of the recording system and the reproducing system in the recording and reproducing apparatus according to the present invention.
Figure 17D:
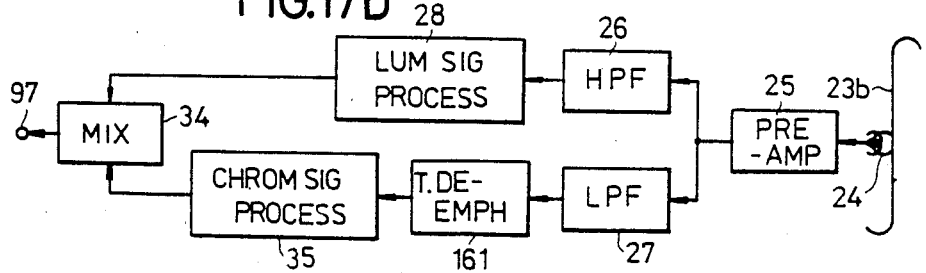

The present invention is not limited to the embodiments described heretofore, and the temporal pre-emphasis and the temporal de-emphasis may be performed independently with respect to the luminance signal and the carrier chrominance signal. Moreover, as shown in FIGS. 17C and 17D, a temporal pre-emphasis circuit 160 and a temporal de-emphasis circuit 161 may be provided so as to perform a temporal pre-emphasis and a temporal de-emphasis with respect to a frequency converted carrier chrominance signal which is frequency-converted into a low frequency band.

In addition, in the case where the temporal de-emphasis circuit which has the non-linear de-emphasis characteristic for performing the de-emphasis with respect to the temporal frequency of the reproduced luminance signal and/or the reproduced carrier chrominance signal is provided in the reproducing system, it is not essential to provide the temporal pre-emphasis circuit in the recording system. The temporal de-emphasis circuit having the non-linear de-emphasis characteristic, does not perform the de-emphasis to a large extent with respect to the input signal having a large amplitude. For this reason, it is possible to obtain a luminance signal and/or a carrier chrominance signal having the original signal waveform even when the reproduced signal is obtained by reproducing a magnetic tape which is recorded by the existing VTR, and it is possible to improve the S/N ratio of the reproduced signal.

It was described heretofore that the delay times of the delay circuits 43, 73, 103, 112, and 145 are each approximately equal to a natural number multiple of one field and is a natural number multiple of H. However, a time of several H may be added to or subtracted from this delay time, or a time of 180 nsec which is required for the scanning in the horizontal direction of a vertical distance between two mutually adjacent horizontal scanning lines in the same field of the picture may be added to or subtracted from the delay time, so as to perform an emphasis in a direction oblique to the time base direction and the vertical direction of the picture. Such a delay time may be obtained by appropriately setting the delay circuit 43 or the like, or by adjusting the phase adjusters 105, 114, and 147.

When the present invention is applied to the recording and reproduction of a PAL system color video signal, the delay time of the delay circuit 103 within the temporal pre-emphasis circuit 95, the delay time of the delay circuit 112 within the de-emphasis circuit 96, and the relationship between the delay time of the delay circuit 145 and the operation (addition and subtraction) of the operation circuits 101, 111, and 144 become as follows. In the case of the PAL system color video signal, the phase of the carrier of one of the two kinds of color difference signals is reversed for every 1H, and there is an offset of approximately H/4 for 1H. Further, the phase of the PAL system carrier chrominance signal is reversed for every frame. In order to perform the pre-emphasis and the de-emphasis with respect to the temporal frequency of the PAL system carrier chrominance signal, the delay time must be set approximately equal to a natural number multiple of one field.

In cases where the delay time is selected to 8 m fields (m=0, 1, 2, ... ), (8 m+1) fields plus 1.5H, (¶m+2) fields minus 1.0H, (8 m+3) fields plus 0.5H, (8 m+4) fields plus or minus 2.0H, (8 m+5) fields minus 0.5H, (8 M+6) fields plus 1.0H, and (8 m+7) fields minus 1.5H, the input and output signals of the delay circuit are in phase, and the operation circuits 101, 111, and 144 perform an addition.

On the other hand, in cases where the delay time is selected to 8 m fields plus or minus 2.0H, (8 m+1) fields minus 0.5H, (8 m+2) fields plus 1.0H, (8 m+3) fields minus 1.5H, (8 m+4) fields, (8 m+5) fields plus 1.5H, (8 m+6) fields minus 1.0H, or (8 m+7) fields plus 0.5H, the input and output signals of the delay circuit are of opposite phases, and the operation circuits 101, 111, and 144 perform a subtraction.

Further, the present invention is not limited to these embodiments, but various variations and modifications may be made without departing from the scope of the present invention.

What is claimed is:

1. A video signal recording and reproducing apparatus having a pre-emphasis and de-emphasis system for noise reduction, said video signal recording and reproducing apparatus comprising:

input terminal means for receiving a color video signal which comprises a luminance signal and a carrier chrominance signal;

separating means supplied with the color video signal from said input terminal means for separating the luminance signal and the carrier chrominance signal from the color video signal;

pre-emphasis circuit means supplied with the separated luminance signal from said separating means, for relatively emphasizing a level of a high-frequency component in a temporal frequency of the separated luminance signal from said separating means compared to a level of a low-frequency component thereof;

modulatiing means for frequency-modulating an output signal of said pre-emphasis circuit means so as to obtain a frequency modulated luminance signal;

recording carrier chrominance signal processing means for frequency-converting the separated carrier chrominance signal from said separating means into a low frequency band so as to obtain a frequency converted carrier chrominance signal;

recording means for multiplexing the frequency modulated luminance signal and the frequency converted carrier chrominance signal, and for recording the multiplexed signal on a recording medium;

reproducing means for reproducing the recorded signal from said recording medium;

demodulating means for separating a reproduced frequency modulated luminance signal from an output reproduced signal of said reproducing means, and for demodulating the reproduced frequency modulated luminance signal so as to obtain a reproduced luminance signal;

filter circuit means for separating a reproduced frequency converted carrier chrominance signal from the output reproduced signal of said reproducing means;

reproduced carrier chrominance signal processing means for performing a predetermined signal processing with respect to the reproduced frequency converted carrier chrominance signal from said filter circuit means so as to obtain a reproduced carrier chrominance signal which is in an original frequency band and has an original phase;

de-emphasis circuit means supplied with the reproduced luminance signal from said demodulating means for relatively attenuating a level of a high-frequency component in a temporal frequency of the reproduced luminance signal from said demodulating means compared to a level of a low-frequency component thereof, said de-emphasis circuit means comprising an input terminal for receiving the reproduced luminance signal, first and second adding circuits each of which is supplied with the reproduced luminance signal from said input terminal, a delay circuit for delaying an output signal of said first adding circuit by a predetermined delay time, said predetermined delay time being a natural number multiple of one field or a time approximately equal thereto and being a natural number multiple of one horizontal scanning period, a first coefficient multiplier for multiplying a first coefficient to an output signal of said delay circuit and for supplying an output signal to said first adding circuit, a second coefficient multiplier for multiplying a second coefficient to the input signal or the output signal of said delay circuit and for supplying an output signal to said second adding circuit, and an output terminal through which a de-emphasized reproduced luminance signal from said second adding circuit is obtained pre-emphasis characteristic of said pre-emphasis circuit means and de-emphasis characteristic of said de-emphasis circuit means being complementary of each other; and mixing means provided in an output stage of said de-emphasis circuit means, for mixing the de-emphasized reproduced luminance signal and the reproduced carrier chrominance signal so as to produce a reproduced color video signal.

2. A recording and reproducing apparatus as claimed in claim 1 in which said de-emphasis circuit means and said pre-emphasis circuit means respectively have a linear de-emphasis characteristic and a linear pre-emphasis characteristic which are independent of the amplitudes of respective input signals of said de-emphasis circuit means and said pre-emphasis circuit means.

3. A recording and reproducing apparatus as claimed in claim 1 in in which said de-emphasis circuit means and said pre-emphasis circuit means respectively have a non-linear de-emphasis characteristic and a non-linear pre-emphasis characteristic which are dependent on the amplitudes of respective input signals of said de-emphasis circuit means and said pre-emphasis circuit means, and a de-emphasis quantity and a pre-emphasis quantity of said de-emphasis circuit means and said pre-emphasis circuit means relatively decrease as the amplitudes of the respective input signals increase.

4. A recording and reproducing apparatus as claimed in claim 1 in which said de-emphasis circuit means and said pre-emphasis circuit means are constituted by a common circuit means, and said common circuit means comprises a differential amplifier for receiving a video signal by a non-inverting input terminal thereof, and for receiving an output signal of said de-emphasis circuit means by an inverting input terminal thereof through a first switch only at the time of a recording, switching means for supplying the video signal to the non-inverting input terminal of, said differential amplifier and for supplying an output signal of said differential amplifier to an input terminal of said de-emphasis circuit means at the time of the recording, and for selectively supplying the reproduced video signal to the input terminal of said de-emphasis circuit means at the time of a reproduction, and a second switch for selectively producing the output signal of said differential amplifier through output terminal means at the time of the recording, and for selectively producing the output signal of said de-emphasis circuit means through said output terminal means at the time of the reproduction.

5. A video signal recording and reproducing apparatus having a pre-emphasis and de-emphasis system for noise reduction, said video signal recording and reproducing apparatus comprising:

input terminal means for receiving a color video signal which comprises a luminance signal and a carrier chrominance signal;

separating means supplied with the color video signal from said input terminal means for separating the luminance signal and the carrier chrominance signal from the color video signal;

pre-emphasis circuit means supplied with the separated luminance signal from said separating means, for relatively emphasizing a level of a high-frequency component in a temporal frequency of the separated luminance signal from said separating means compared to a level of a low-frequency component thereof;

modulating means for frequency-modulating an output signal of said pre-emphasis circuit means so as to obtain a frequency modulated luminance signal;

recording carrier chrominance signal processing means for frequency-converting the separated carrier chrominance signal from said separating means into a low frequency band so as to obtain a frequency converted carrier chrominance signal;

recording means for multiplexing the frequency modulated luminance signal and the frequency converted carrier chrominance signal, and for recording the multiplexed signal on a recording medium;

reproduced means for reproducing the recorded signal from said recording medium;

demodulating means for separating a reproduced frequency modulated luminance signal from an output reproduced signal of said reproducing means, and for demodulating the reproduced frequency modulated luminance signal so as to obtain a reproduced luminance signal;

filter circuit means for separating a reproduced frequency converted carrier chrominance signal from the output reproduced signal of said reproducing means;

reproduced carrier chrominance signal processing means for performing a predetermined signal processing with respect to the reproduced frequency converted carrier chrominance signal from said filter circuit means so as to obtain a reproduced carrier chrominance signal which is in an original frequency band and has an original phase;

de-emphasis circuit means supplied with the reproduced luminance signal from said demodulating means for relatively attenuating a level of a high-frequency component in a temporal frequency of the reproduced luminance signal from said demodulating means compared to a level of a low-frequency component thereof; said de-emphasis circuit means comprising an input terminal for receiving the reproduced luminance signal, an adding circuit and first and second subtracting circuits each of which is supplied with the reproduced luminance signal from said input terminal, a delay circuit for delaying an output signal of said adding circuit by a predetermined delay time, said predetermined delay time being a natural number multiple of one field or a time approximately equal thereto and being a natural number multiple of one horizontal scanning period, a first coefficient multiplier for multiplying a first coefficient to an output signal of said delay circuit and for supplying an output signal to said adding circuit, a second coefficient multiplier for multiplying a second coefficient to the input signal of said delay circuit and for supplying an output signal to said first subtracting circuit, a non-linear circuit for giving a non-linear characteristic with respect to the amplitude of an output signal of said first subtracting circuit, a third coefficient multiplier for multiplying a third coefficient to an output signal of said non-linear circuit, and an output terminal through which an output reproduced luminance signal of said second subtracting circuit is obtained, said output reproduced luminance signal of said second subtracting circuit being subjected to a non-linear de-emphasis, pre-emphasis characteristic of said pre-emphasis circuit means and de-emphasis characteristic of said de-emphasis circuit means being complementary of each other; and mixing means provided in an output stage of said de-emphasis circuit means, for mixing the reproduced luminance signal and the reproduced carrier chrominance signal so as to produced carrier chrominance signal so as to produce a reproduced color video signal.

6. A video signal recording and reproducing apparatus having a pre-emphasis and de-emphasis system for noise reduction, said video signal recording and reproducing apparatus comprising:

input terminal means for receiving a color video signal which comprises a luminance signal and a carrier chrominance signal;

separating means supplied with the color video signal from said input terminal means for separating the luminance signal and the carrier chrominance signal from the color video signal;

modulating means for frequency- modulating the separated luminance signal from said separating means so as to obtain a frequency modulated luminance signal;

recording carrier chrominance signal processing means for frequency-converting the separated carrier chrominance signal from said separating means into a low frequency band so as to obtain a frequency converted carrier chrominance signal;

pre-emphasis circuit means provided in one of input and output stages of said recording carrier chrominance signal processing means, for relatively emphasizing a level of a high-frequency component in a temporal frequency of said frequency-converted carrier chrominance signal compared to a level of a low-frequency component thereof;

recording means for multiplexing the frequency modulated luminance signal and the frequency converted carrier chrominance signal, and for recording the multiplexed signal on a recording medium;

reproducing means for reproducing the recorded signal from said recording medium;

demodulating means for separating a reproduced frequency modulated luminance signal from an output reproduced signal of said reproducing means, and for demodulating reproduced frequency modulated luminance signal so as to obtain a reproduced luminance signal;

filter circuit means for separating a reproduced frequency converted carrier chrominance signal from the output reproduced signal of said reproducing means;

reproduced carrier chrominance signal processing means for performing a predetermined signal processing with respect to the reproduced frequency converted carrier chrominance signal from said filter circuit means so as to obtain a reproduced carrier chrominance signal which is in an orignginal frequency band and has an original phase;

de-emphasis circuit means provided in one of input and output stages of said reproduced carrier chrominance signal processing means relatively attenuating a level of a high-frequency component in a temporal frequency of said reproduced carrier chrominance signal compared to a level of a low-frequency component thereof; and mixing means provided in an output stage of said reproduced carrier chrominance processing means and said de-emphasis circuit means, for mixing the reproduced luminance signal and the reproduced carrier chrominance signal so as to produce a reproduced color video signal, said de-emphasis circuit means comprising an input terminal for receiving one of the reproduced carrier chrominance signal and the reproduced frequency converted carrier chominance signal, an operation circuit and an adding circuit each of which is supplied with the signal from the input terminal, a delay circuit for delaying an output signal of said operation circuit by a predetermined delay time, said predetermined delay time being a natural number multiple of one field or a time approximately equal thereto and being a natural number multiple of one horizontal scanning period, a first coefficient multiplier for multipying a first coefficient to an input signal or an output signal of said delay circuit, a phase adjuster for adjusting the phase of an output signal of said first coefficient multiplier and for supplying an output signal to said operation circuit, said operation circuit carrying out one of an addition and a subtraction with respect to the signal supplied from the input terminal and the output signal of said phase adjuster depending on said predetermined delay time, a second coefficient multiplier for multiplying a second coefficient to the output signal of said delay circuit and for supplying an output signal to said adding circuit, said adding circuit adding the signal which is supplied from said input terminal and the output signal of said second coefficient circuit, and an output terminal through which one of an output de-emphasized reproduced carrier chrominance signal and an output de-emphasized frequency converted carrier chrominance signal of said adding circuit is obtained, pre-emphasis characterisitic of said pre-emphasis circuit means and de-emphasis characteristic of said de-emphasis circuit means being complementary to each other.

7. A video signal recording and reproducing apparatus having a pre-emphasis and de-empahsis system for noise reduction, said video signal recording and reproducing apparatus comprising:
input terminal means for receiving a color video signal which comprises a luminance signal and a carrier chrominance signal;
separating means supplied with the color video signal from said input terminal means for separating the luminance signal and the carrier chrominance signal from the color video signal;
modulating means for frequency-modulating the separated luminance signal from said separating means so as to obtain a frequency modulated luminance signal;
recording carrier chrominance signal processing means for frequency-converting the separated carrier chrominance signal from said separating means into a low frequency band so as to obtain a frequency converted carrier chrominance signal;
pre-emphasis circuit means provided in one of input and output stages of said recording carrier chrominance signal processing means, for relatively emphasizing a level of a high-frequency component in a temporal frequency of said frequency converted carrier chrominance signal compared to a level of a low-frequency component thereof;
recording means for multiplexing the frequency modulated luminance signal and the frequency converted carrier chrominance signal, and for recording the multiplexed signal on a recording medium;
reproducing means for reproducing the recorded signal from said recording medium;
demodulating means for separating a reproduced frequency modulated luminance signal from an output reproduced signal of said reproducing means, and for demodulating the reproduced frequency modulated luminance signal so as to obtain a reproduced luminance signal;
filter circuit means for separating a reproduced frequency converted carrier chrominance signal from the output reproduced signal of said reproducing means;
reproduced carrier chrominance signal processing means for performing a predetermined signal processing with respect to the reproduced frequency converted carrier chrominance signal from said filter circuit means so as to obtain a reproduced chrominance signal which is in an original frequency band and has an original phase;
de-emphasis circuit means provided in one of input and output stages of said reproduced carrier chrominance signal processing means relatively attenuating a level of a high-frequency component in a temporal frequency of said reproduced carrier chrominance signal compared to a level of a low-frequency component thereof; and
mixing means provided in an output stage of said reproduced carrier chrominance processing means and said de-emphasis circuit means, for mixing the reproduced luminance signal and the reproduced carrier chrominance signal so as to produce a reproduced color video signal,
said de-emphasis circuit means comprising an input terminal for receiving one of the reproduced carrier chrominance signal and the reproduced frequency converted carrier chrominance signal, an operation circuit and first and second subtracting circuits each of which is supplied with the signal from said input terminal, a delay circuit for delaying an output signal of said operation circuit by a predetermined delay time, said predetermined delay time being a natural number multiple of one field or a time approximately equal thereto and being a natural number multiple of one horizontal scanning period, a first coefficient multiplier for multiplying a first coefficient to an output siganl of said delay circuit, a phase adjuster for adjusting the phase of an output signal of said first coefficient multiplier and for supplying an output signal to said operation circuit, said operation circuit carrying out one of an addition and a subtaction with respect to the signal supplied from the input terminal and the output signal of said phase adjuster depending on said predetermined delay time, a second coefficient multiplier for multiplying a second coefficient to the input signal of said delay circuit and for supplying an output signal to said first subtracting circuit, a non-linear circuit for giving a non-linear characteristic with respect to the amplitude of an output signal of said first subtracting circuit, a third coefficient multiplier for multiplying a third coefficient to an output signal of said non-linear circuit and for supplying an output signal to said second subtracting circuit, and an output terminal through which one of an output reproduced carrier chrominance signal and an output reproduced frequency converted carrier chrominance signal of said second subtracting circuit is obtained, said one of said output reproduced carrier chrominance signal and said output reproduced frequency converted carrier chrominance signal of said second subtracting circuit being subjected to a non-linear de-emphasis pre-emphasis characteristic of said pre-emphasis circuit means and de-emphasis characteristic of said de-emphasis circuit means being complementary to each other.

* * * * *